United States Patent
Pavlovskaia et al.

(10) Patent No.: US 8,442,110 B2
(45) Date of Patent: May 14, 2013

(54) METHOD FOR BANDWIDTH REGULATION ON A CABLE TELEVISION SYSTEM CHANNEL

(75) Inventors: Lena Y. Pavlovskaia, Cupertino, CA (US); Robert Johnson, San Jose, CA (US); Airan Landau, San Jose, CA (US); Amos Kohn, Campbell, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 1252 days.

(21) Appl. No.: 12/248,059

(22) Filed: Oct. 9, 2008

(65) Prior Publication Data

US 2009/0041118 A1    Feb. 12, 2009

Related U.S. Application Data

(63) Continuation of application No. 11/158,895, filed on Jun. 22, 2005, now abandoned, which is a continuation-in-part of application No. 09/848,812, filed on May 4, 2001, now abandoned.

(60) Provisional application No. 60/202,338, filed on May 5, 2000.

(51) Int. Cl.

| | |
|---|---|
| *H04N 7/12* | (2006.01) |
| *H04N 11/02* | (2006.01) |
| *H04N 11/04* | (2006.01) |
| *H04N 7/00* | (2006.01) |
| *H04N 11/00* | (2006.01) |
| *H04N 7/167* | (2006.01) |
| *H04N 7/18* | (2006.01) |

(52) U.S. Cl.
USPC ............... 375/240.01; 375/240.02; 348/461; 380/212; 725/81

(58) Field of Classification Search ............ 375/240.01
See application file for complete search history.

(56) References Cited

U.S. PATENT DOCUMENTS

| | | | |
|---|---|---|---|
| 4,186,438 A | 1/1980 | Benson et al. | 364/200 |
| 4,903,126 A | 2/1990 | Kassatly | 358/146 |

(Continued)

FOREIGN PATENT DOCUMENTS

| | | |
|---|---|---|
| EP | 0 477 786 A2 | 4/1992 |
| WO | 2004012437 | 2/2004 |

OTHER PUBLICATIONS

Ellis, M.S., et al., "INDAX: An Operational Interactive Cabletext System," *IEEE Journal on Selected Areas in Communication*, vol. SAC—1, No. 2, Feb. 1983, pp. 285-94.

(Continued)

*Primary Examiner* — Christopher S Kelley
*Assistant Examiner* — Hee-Yong Kim
(74) *Attorney, Agent, or Firm* — Sunstein Kann Murphy & Timbers LLP

(57) ABSTRACT

A method for regulating bandwidth usage in an output data stream transmitted on an analog channel from a cable head end. The output data stream comprises a plurality of input information content signals. For each input information content signal, a series of images are captured, compressed and formed into an input digital data stream. The bandwidth of each input digital data stream is regulated by associating the stream with a current bit allocation total. During each frame time: a bit allocation increment is added to the current bit allocation total for each input digital data stream. When a data packet to be transmitted for an input digital data stream is received by the multiplexer, the data packet is stored. When the number of bits in the stored data packet is not more than the current bit allocation total for the input digital data stream, the multiplexer forwards the stored data packet for transmission in the output data stream on the analog channel and decrements the current bit allocation total for the given input digital data stream by the number of bits in the stored data packet. In this way, no individual input channel takes more than its share of the bandwidth on the output stream on the analog channel.

12 Claims, 15 Drawing Sheets

U.S. PATENT DOCUMENTS

| | | | |
|---|---|---|---|
| 4,975,771 A | 12/1990 | Kassatly | 358/146 |
| 5,093,718 A | 3/1992 | Hoarty et al. | 358/84 |
| 5,172,413 A | 12/1992 | Bradley et al. | 380/20 |
| 5,220,420 A | 6/1993 | Hoarty et al. | 358/86 |
| 5,319,455 A | 6/1994 | Hoarty et al. | 348/7 |
| 5,319,707 A * | 6/1994 | Wasilewski et al. | 380/212 |
| 5,371,532 A | 12/1994 | Gelman et al. | 348/7 |
| 5,404,393 A | 4/1995 | Remillard | 379/96 |
| 5,422,674 A | 6/1995 | Hooper et al. | 348/409 |
| 5,442,390 A | 8/1995 | Hooper et al. | 348/7 |
| 5,485,197 A | 1/1996 | Hoarty et al. | 348/7 |
| 5,487,066 A * | 1/1996 | McNamara et al. | 370/436 |
| 5,786,527 A | 7/1998 | Tarte | 73/19.01 |
| 5,812,786 A | 9/1998 | Seaholtz | 395/200.63 |
| 5,862,325 A | 1/1999 | Reed et al. | 395/200.31 |
| 5,903,816 A | 5/1999 | Broadwin et al. | 455/3.1 |
| 5,907,681 A | 5/1999 | Bates et al. | 395/200.58 |
| 5,961,603 A | 10/1999 | Kunkel et al. | |
| 5,982,445 A * | 11/1999 | Eyer et al. | 348/461 |
| 5,999,970 A | 12/1999 | Krisbergh et al. | 709/217 |
| 6,031,989 A | 2/2000 | Cordell | 395/701 |
| 6,049,539 A | 4/2000 | Lee et al. | 370/355 |
| 6,167,084 A * | 12/2000 | Wang et al. | 375/240.02 |
| 6,182,072 B1 | 1/2001 | Leak et al. | 707/10 |
| 6,205,582 B1 | 3/2001 | Hoarty | 725/93 |
| 6,266,369 B1 | 7/2001 | Wang et al. | 375/240 |
| 6,317,885 B1 | 11/2001 | Fries et al. | 725/109 |
| 6,389,075 B2 | 5/2002 | Wang et al. | 375/240.16 |
| 6,459,427 B1 | 10/2002 | Mao et al. | 345/327 |
| 6,675,385 B1 | 1/2004 | Wang | 725/39 |
| 6,785,902 B1 | 8/2004 | Zigmond et al. | 725/38 |
| 6,886,178 B1 | 4/2005 | Mao et al. | 725/52 |
| 6,941,574 B1 | 9/2005 | Broadwin et al. | 725/37 |
| 2002/0026642 A1 | 2/2002 | Augenbraun et al. | |
| 2004/0128686 A1 | 7/2004 | Boyer et al. | |
| 2006/0095944 A1 * | 5/2006 | Demircin et al. | 725/81 |

OTHER PUBLICATIONS

Frezza, W., "The Broadband Solution—Metropolitan CATV Networks," *Proceedings of Videotex '84*, Apr. 1984, all pages.

International Search Report; dated Nov. 20, 2006; received Nov. 27, 2006; PCT/US2006/022533.

* cited by examiner

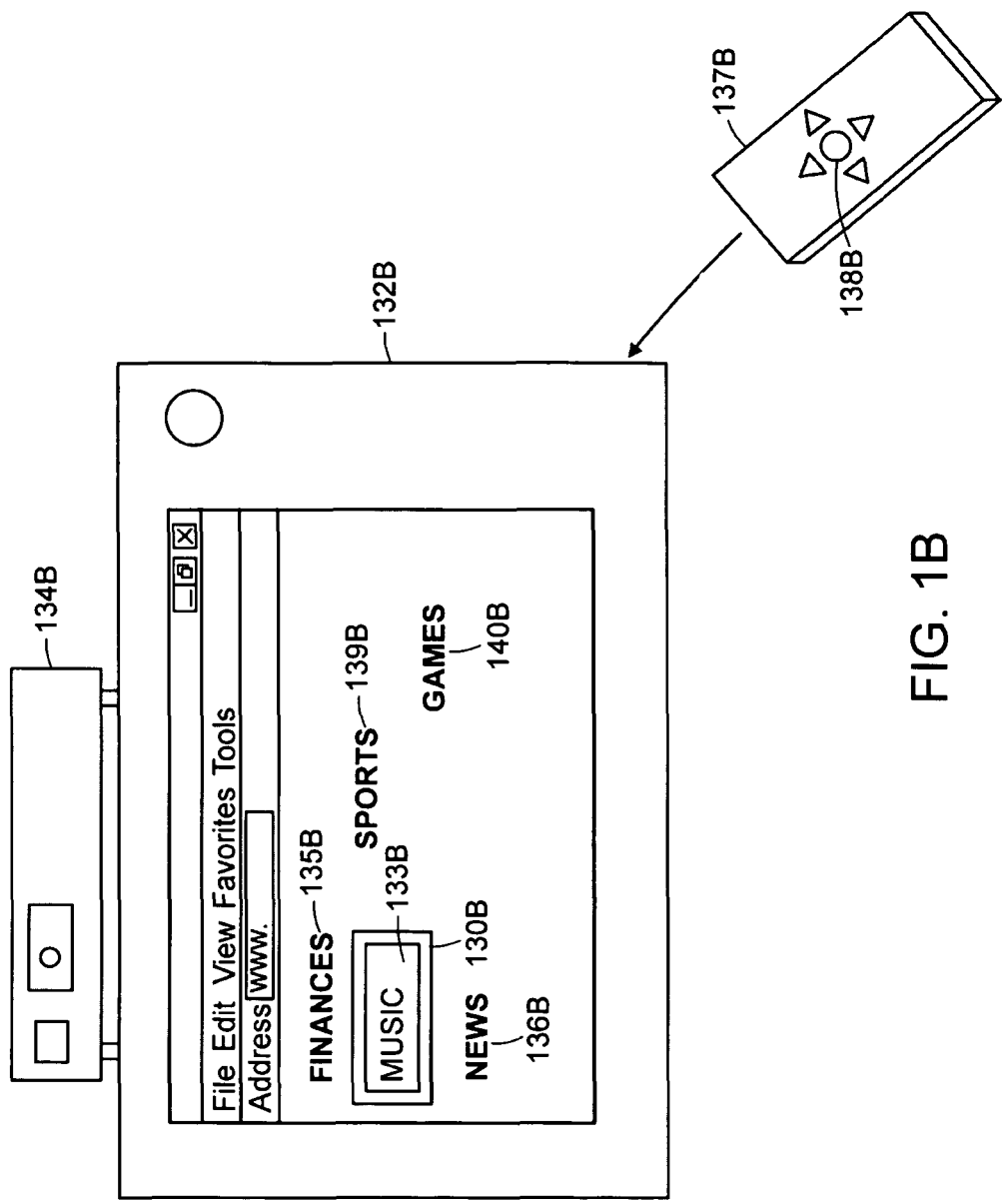

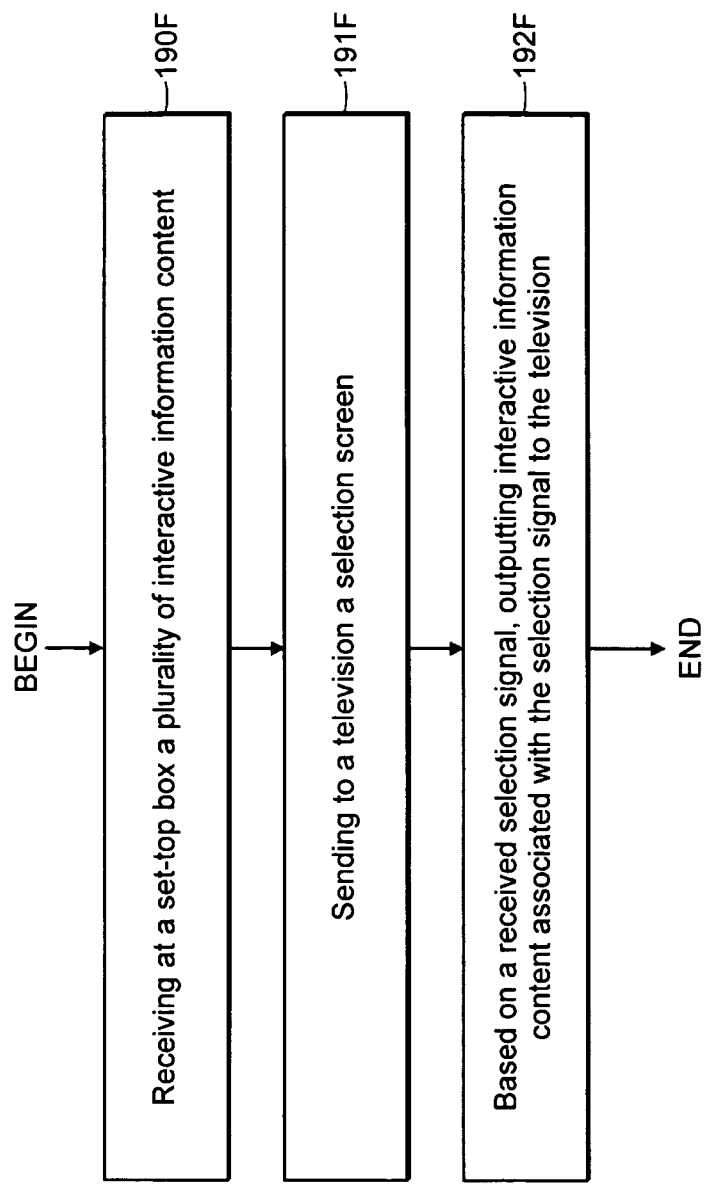

```
<HTML><HEAD><SCRIPT language=JavaScript>
    var AdURL=new Array(4); var MaxSite=3;
    var adindex=0;
    var scriptTimeout=2000;

AdURL[0]="www.Ski_Area_1.html";
    AdURL[1]="www.Ski_Area_2.html";
    AdURL[2]="www.Ski_Area_3.html";
    AdURL[3]="www.Ski_Area_4.html";
```
500
502 function loadPage() {var offset; adindex=getSearchValue("ScriptIndex");
    if (adindex=="") adindex=0; if (adindex>MaxSite) adindex=0;
    ArctosScriptFrame.location=AdURL[adindex];
    setTimecut("bumpNumber()", scriptTimeout);}

504 function bumpNumber() {adindex++; if (adindex>MaxSite) adindex=0;
    if (location.search.length>0) {var RetStr=""; var searchStr=
"Scriptindex+"; var offset=0; var end =0; var len=0;
        if (offset !=-1) {offset +=searchStr.length; end=
location.search.indexOf("&", offset);
        if (end==-1) end = location.search.length; len=location.search.length;
RetStr = location.pathname + unescape(location.search.substring(0, offset)) +
adindex + unescape(location.search.substring(end, len));} else{retStr = location.href + "ScriptIndex=" + adindex;}
}
else {RetStr = location.pathname + "?ScriptIndex=" + adindex;}
location = ReStr;}
506
function getSearchValue(name){ var searchStr = name + "=";var RetStr =
"";var offset = 0; var end = 0
  if (location.search.length > 0) { offset = location.search.indexOf(searchStr)
  if )offset !=-1) { offset +=searchStr.length; end = location.search.indexOf("&",
offset)
  if (end == -1)
end = location.search.length
RetStr = unescape(location.search.substring(offset, end))}
}
return (RetStr)}
</SCRIPT> 508
<BODY SCROLLING=NO BGCOLOR=BLACK onload=loadPage()>
<IFRAME ALIGN=CENTER BGCOLOR=BLACK frameBorder=0 height=480
width=640 name=ArctosScript SCROLLING=NO></IFRAME></BODY>
</HTML>

Table 600:

| Status | Ch. # | Ch. Name | Cur. URL | Start URL | HTML | Reload (mS) | Capture (mS) | Ch. (bps) | Encode (bps) | Prog.ID | PID | PMT |
|---|---|---|---|---|---|---|---|---|---|---|---|---|
| Inactive | 1 | Ch.100 | ... | | | | ... | | | | ... | |
| Active | 149 | 149 | Movie | Movie | False | 1000 | | | | | | |
| Active | 150 | 150 | Ski_Ar. | SkiA_2 | True | | | | | | | |
| 462 | 464 | 466 | 468 | 470 | 472 | 474 | 476 | 478 | 480 | 482 | 484 | 486 |

FIG. 6B

Table 602:

| 1st V. Ch | 1st PMD PID | 1st Serv. # | Max Ch | PID Inc | 1st V. PID | TCP Port Off | Width | Height | Margins | T.Sream ID | Total BW | Available BW |
|---|---|---|---|---|---|---|---|---|---|---|---|---|
| 430 | 432 | 434 | 436 | 438 | 440 | 442 | 444 | 446 | 448-454 | 456 | 458 | 460 |

METHOD FOR BANDWIDTH REGULATION ON A CABLE TELEVISION SYSTEM CHANNEL

This application is a continuation of U.S. patent application Ser. No. 11/158,895, filed Jun. 22, 2005, which is a continuation-in-part ("CIP") of U.S. patent application Ser. No. 09/848,812 filed on May 4, 2001 that claims priority from U.S. Provisional Application 60/202,338 filed on May 5, 2000, each of which applications is incorporated herein by reference in its entirety.

TECHNICAL FIELD AND BACKGROUND ART

The invention pertains to television systems, particularly digital headend content distribution systems.

DESCRIPTION OF THE RELATED ART

Cable television systems have not yet achieved the promise of the 500 channel TV set, largely due to bandwidth constraints for delivering the channels to the subscribers over cable plant. Although a coaxial cable system may permit a cable system operator to provide, for example, 50 television channels, each 6 MHz wide, with a total bandwidth of 300 MHz, this total bandwidth is insufficient to permit an arrangement wherein each subscriber may have, in addition to these 50 channels, an additional 50 to 450 channels. Communication with a subscriber begins at the headend and proceeds over a communication path that involves one of a number of trunks, and then over one of a number of feeders, then over one of a number of taps. Each feeder may have, for example, fifty or more subscribers, and each trunk might serve a hundred or more feeders. The result is that 500 subscribers per trunk are not atypical. Thus merely to provide a private one-way information service, and nothing else, to each of these 5000 subscribers would require the trunk to carry 5000 different signals, each using about 6 MHz of bandwidth, and would alone require a trunk bandwidth of 30 (biz, which is nearly two orders of magnitude greater than provided by a typical coaxial cable system.

What is needed is a low cost, low bandwidth means for delivering content to cable television subscribers.

SUMMARY OF THE INVENTION

The present invention provides a method and apparatus for providing low bandwidth and low cost content to cable television subscribers. The apparatus involves an inexpensive web content server which can be integrated with existing cable headends and which can deliver up to 50 discrete digital channels on a single 6 MHz bandwidth slot. The web content server includes an administrative tool which allows quick provisioning and configuring of existing channels. The web content server generates a set of browser instances with each browser instance cycl'ng through its own unique set of web pages. The web pages may be stored locally on the web content server or located globally on the Internet or other wide area network (WAN) or local area network (LAN). The web server periodically captures digital images corresponding with the web pages displayed by each browser instance and individually processes each as a discrete digital channel. The digital channels are multiplexed onto a single 6 MHz analog channel. At the set top box or the TV itself each image stream corresponding with each browser instance is presented to the subscriber as a separately selectable channel. The content may be used to deliver any information currently available on the Internet, or generated locally as Web pages.

An embodiment of the invention teaches a method for providing interactive information content in an analog cable system having only a one-way communication path from a cable head end to a communication device, such as a set-top box that is associated with a television. A set-top box receives a plurality of interactive information content signals on at least one analog channel from the cable head end. In certain embodiments the interactive information content signals are data streams that sent over an analog carrier channel. The set-top box provides one of the interactive information content signals to the television for display. The interactive information content signal is a selection screen. A user can then use a user-input device, such as, a remote control to make a selection. In general, the user will select a key, such as a directional key and the remote control will provide the selection/directional signal to the set-top box. The set-top box then outputs a new information content signal based the received selection signal. In certain embodiments a map is sent from the cable head end to the set-top box and the set-top box uses the map to determine the next interactive information content signal to provide to the television. The interactive information content signals may be MPEG data streams and the set-top box may decode the data stream prior to providing the information content to the television. In one embodiment, the interactive information content is representative of a web page.

The map that is provided by the cable head end may be a coordinate map that relates locations of web links from displayed versions of the interactive information content streams with selection signals from a user input device. Thus, the set-top box can receive a directional signal and can determine which data stream should be decoded and displayed on the television. In embodiments, a stream may periodically have data updated for the web page wherein the data is sent from the head end.

In certain embodiments, all of the interactive information content signals are sent on a single analog channel in the cable television network. The selection screen may be one of the interactive information content signals wherein the set-top box will access the selection screen first.

In embodiments of the invention, a method is provided for regulating bandwidth usage in an output data stream transmitted on an analog channel from a cable head end. The output data stream comprises a plurality of input information content signals. For each input information content signal, a series of images are captured, compressed and formed into an input digital data stream. The input digital data stream is broken into packets and output to a multiplexer. The bandwidth of each input digital data stream in the output stream is regulated by associating the stream with a current bit allocation total. During each frame time a bit allocation increment is added to the current bit allocation total for each input digital data stream. When a data packet to be transmitted for an input digital data stream is received by the multiplexer, the data packet is stored. When the number of bits in the stored data packet is not more than the current bit allocation total for the input digital data stream, the multiplexer forwards the stored data packet for transmission in the output data stream on the analog channel and decrements the current bit allocation total for the given input digital data stream by the number of bits in the stored data packet. In this way, no individual input channel takes more than its share of the bandwidth in the output stream on the analog channel.

BRIEF DESCRIPTION OF THE DRAWINGS

These and other features and advantages of the present invention will become more apparent to those skilled in the art from the following detailed description in conjunction with the appended drawings in which:

FIG. 1B shows an indicator superimposed on a television.

FIG. 1F shows a flow chart of the steps that are performed by the set-top box when a request is made for interactive content in a cable system that provides only one-way transmission of information content.

FIG. 5 shows a master web page for a channel. The master web page is generated in a markup language for defining content associated with a single digital channel.

FIGS. 6A-B show the channel and system setup tables respectively.

DETAILED DESCRIPTION OF SPECIFIC EMBODIMENTS

The term "information content" shall refer to data that is displayable on a display device, such as, but not limited to web pages, and video content. The term "digital transport stream" refers to digital data that is transmitted from a head end to a set-top box for decoding and display. The digital transport stream may contain static content that is non-dynamic data, such as images or HTML pages that is broadcast either continually or periodically. Displayable data need not be included in the transmitted digital transport stream at all times.

The present invention provides a method and apparatus for providing low bandwidth and low cost content to cable television subscribers. The apparatus involves an inexpensive web content server which can be integrated with existing cable headends and which can deliver up to 50 discrete digital channels on a single 6 MHz bandwidth slot. The web content server includes an administrative tool which allows quick provisioning and configuring of existing channels. The web content server generates set of browser instances with each browser instance cycling through its own unique set of web pages. The web pages may be stored locally on the web content server or located globally on the Internet or other wide area network (WAN) or local area network (LAN). The web server periodically captures digital images corresponding with each of the browser images and individually processes each as a discrete digital channel. Each digital channel is multiplexed onto a single 6 MHz analog channel. At the set top box or the TV itself each image stream corresponding with each browser instance is presented to the subscriber as a separately selectable channel. The content may be used to deliver any information currently available on the Internet.

Figure 1:
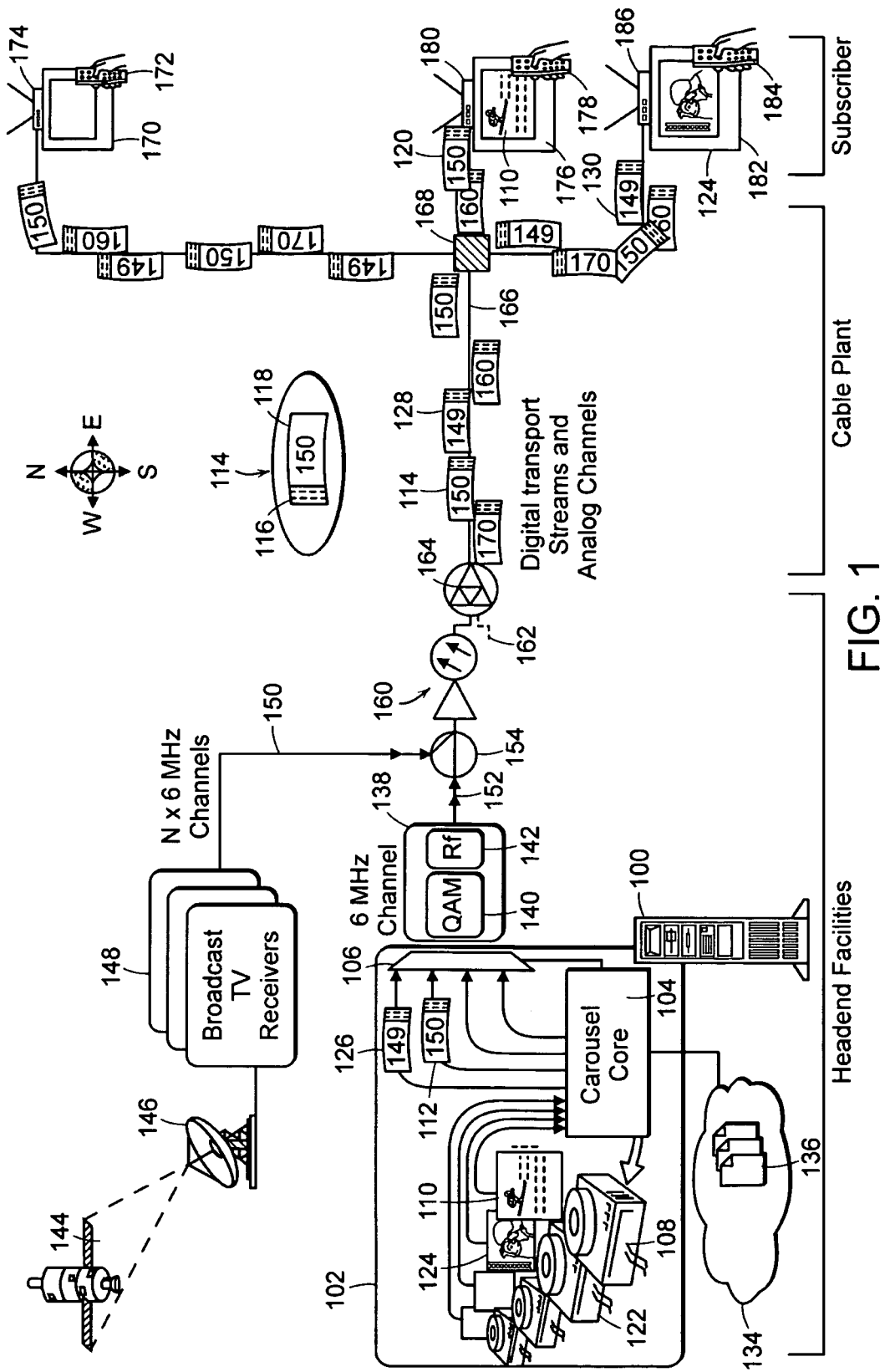
FIG. 1 shows the overall system environment showing a plurality of Cable TV subscribers coupled across a cable plant to a cable headend which includes a web content server for delivery of a plurality of low bandwidth digital channels to the user on a single selected analog channel.

FIG. 1 shows the overall system environment showing a plurality of Cable TV subscribers coupled across a cable plant to a cable headend which includes a web content server for delivery of a plurality of low bandwidth digital channels to the subscriber's TV on a single selected analog channel. The cable head end facilities include a plurality of broadcast TV receivers accepting a downlink from satellite 144 via receiver 146. The "N" broadcast channels are each delivered in an corresponding analog 6 MHz channel along signal line 150 to a directional coupler 154 where they are inserted into the cable plant 166 via a forward laser 160 and a circulator 164. The circulator may provide a return path 162 from the subscribers. In addition to this traditional headend structure the current invention provides for the utilization of at least one additional 6 MHz bandwidth slot for the injection of 50 or more additional channels. The channels are generated by the web content server a.k.a. carousel server 100. The carousel server allows the authoring, setup, generation, control and injection of 50 or more discrete digital channels into the broadcast stream from the headend.

Block 102 shows the basic software modules which make up the carousel server. The carousel core 104 handles the authoring, setup generation and control of a plurality of instances 108, 122 of a browser application, such as Internet Explorer®, Microsoft Corp. Redmond Wash. Each browser application follows its own "slide" carousel format as governed by an associated HTML master page (See FIG. 5). The "slides" of each carousel are the web pages displayed by each carousel. The carousel server 100 is coupled to the Internet 134. The web pages which provide the content for the "slide carousel" provided by each browser instance may be stored locally or accessed, as in the case of web pages 136, over the Internet. There is one browser instance with its corresponding individual carousel per channel.

Browser instance 108 cycles through a carousel of web page(s) which includes web page 110 which displays snow and slope conditions from the home page of a ski resort selected by the content provider to be part of this channel, e.g. the "Snow Report" channel 150. This browser instance provides the content for digital channel 150.

Browser instance 122 generates a carousel of web page(s) which includes web page 124 which displays streaming video clips of the latest movie releases. The web page 124 is selected by the content provider to be part of this channel, e.g. the "Movie Review" channel 149. The images from each browser instance are captured by the carousel core at intervals which are programmed for each channel during channel authoring or setup. The carousel core provides compression of each image in a suitable image compression format. In an embodiment of the invention compression follows the Motion Picture Expert Group compression standard MPEG2. Each channel is output by the carousel core in compressed form as an elementary stream.

Typically the reload, capture or refresh interval for each channel is one or two orders of magnitude less than the image capture rate for a normal video stream in which 30 frames are captured every second. This greatly reduces the bandwidth requirements and allows more channels to be carried on a 6

MHz analog channel. In MPEG terminology, the MPEG compressor will typically only output "I" frames for each channel and will avoid creation of "B" or "P" frames. Elementary streams 112 and 126 corresponding with browser instances 108 and 122 respectively are shown.

In an embodiment of the invention each browser uses its own compressor component. In another embodiment of the invention a single compressor component constructs separate elementary streams from the encoded "I" frames corresponding to the images from each browser. This works because the encoded "I" frame are independent of adjacent "P" frames from the other channels.

The multiplexer 106 receives these elementary streams and converts them to transport streams which are subject to modulation in quadrature amplitude modulation (QAM) module 140 and upconversion to radio frequency (Rf) in Rf uplink module 142. This multiplexed digital transport streams are injected via signal line 152 into the to directional coupler 154 with the "N" analog broadcast TV channels and are then inserted into the cable plant 166 via the forward laser 160 and circulator 164. The transport stream (TS) includes TS packets for each digital channel. The TS packets 114 and 120 are shown with payload corresponding with channel 150, the "Snow Report" channel. The TS packets 128, 130 are shown with payload corresponding with channel 149, the "Movie Review" channel. Each packet has a 4-byte header that includes a packet identification code (PID) and a payload. For packet 114 the header 116 and payload 118 are shown. The packets are of fixed-length, i.e. 188 bytes long. All packets carrying the same elementary stream have the same PID. A sequence number in the packet header ensures that the packets are decoded in the associated set top box.

Each transport stream also includes other TS packets that contain the program mapping table (PMT) for each program and the program association table (PAT) for the entire stream. The payload of the PAT packet contains the service numbers and corresponding PMT PID numbers for each program. The payload of the PMT packet contains the program clock reference (PCR) PID and elementary stream (ES) PID for the corresponding program (See FIG. 4A). In an embodiment of the invention the programs use a common PCR stream which contains timing information for all the programs in the TS.

The subscriber side shows three subscribers each with an associated TV, remote control, and set top box combination which are coupled via node 168 to the cable plant. TV 182 couples to the cable plant via set top box 186. Remote control 184 is used to set the set top box 186 to the appropriate selection of either a digital or analog channel. In the example shown the user has selected the "Movie Review" channel 149. The set top box 186 periodically refreshes its image buffer with the "I" frames contained in the corresponding TS packets. One of those I frames corresponds with image 124 originally generated by the browser instance 122 in the carousel server on the cable headend. The contents of the image buffer of the set top box 186 are decompressed and displayed on the subscribers TV 182.

TV 176 couples to the cable plant via set top box 180. Remote control 178 is used to set the set top box 180 to the appropriate selection of either a digital or analog channel. In the example shown the user has selected the "Snow Report" channel 150. The set top box 180 periodically refreshes its image buffer with the "I" frames contained in the corresponding TS packets. One of those I frames corresponds with image 110 originally generated by the browser instance 108 in the carousel server on the cable headend. The contents of the image buffer of the set top box 180 are decompressed and displayed on the subscribers TV 176.

TV 170 couples to the cable plant via set top box 174. Remote control 172 is used to set the set top box 174 to the appropriate selection of either a digital or analog channel.

The practice of the current invention is not limited to a cable plant distribution 20 medium. Distribution from headend to subscriber could alternately be made by alternate wired mediums such as XDSL or via wireless mediums such as satellite.

Figure 1A:
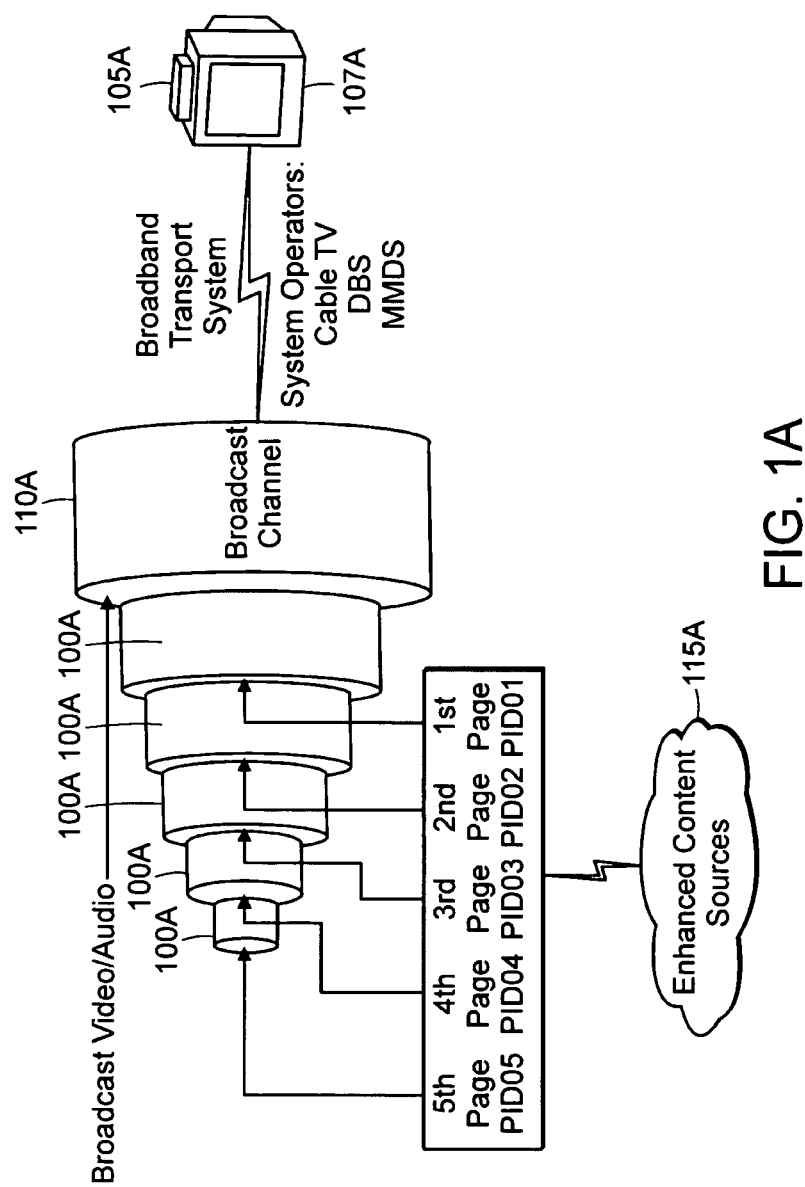
FIG. 1A shows an example of the digital transport streams.

FIG. 1A shows an example of the digital transport streams 100A as they are sent to the set-top box 105A. The digital transport streams 100A are sent over an analog broadcast channel 110A. On the analog channel 110A are a series of digital transport streams 100A containing data 115A. Data may be continually transmitted in the digital stream to the set-top box, the digital data may be periodically sent to the set-top box on the analog channel for static content, or the digital data stream may be sent only when content information is updated. As shown in FIG. 1A there are five digital data streams 100A transmitted on a single analog broadcast channel 110A. It should be understood that more than five digital data streams may be included and that five digital data streams are shown simply for exemplary purposes. Each digital transport stream 100A represents a separate page of information content for display on a television screen. Associated with each digital transport stream is an identifier, such as PID 01, PID 02 etc. Thus, if a user tunes into an interactive television station, the user will be presented with a first page (first stream) of information content (PID 01). The user can then switch from one stream to another by highlighting an on screen selection indicator and pressing a selection button, such as 'OK' on a remote control. Navigation between icons is accomplished by the set-top box which superimposes the selection indicator onto the displayed content and responds to commands, such as directional commands, from the user input device.

In certain embodiments, the interactive information content 115A in the digital transport streams 100A may be subscription-based and therefore the digital transport streams 100A are encrypted. In such an embodiment, the set-top box 105A that is associated with a user's television 107A is at least capable of decrypting the digital data in the digital transport streams and decompressing the MPEG stream. The environment shown in FIG. 1 is capable of providing an interactive experience for a user that is associated with a television. In one interactive embodiment, the set-top box includes a processor and associated computer program for receiving requests for new information content that is not included in the digital transport streams. In this embodiment, the request is sent from the set-top box to the headend. The headend facility can access the new desired information content and can process the information content as an MPEG stream which is then transmitted on an analog carrier to the requesting set-top box. This analog carrier may be different than the original analog carrier. In such an embodiment, the head end would send a control signal to the set-top box, instructing the set-top box to change channels. The set-top box would then change the channel and present the new information content/web page. The set-top box decodes the MPEG stream and displays the information content on the user's television. In certain embodiments, the information content may be web pages from the Internet. A user can employ a user input device, such as a keyboard or a remote control to traverse the web page and select links that are highlighted. The user transmits a directional command and the set-top box determines the link that is being selected. The set-top box then checks to see if the link is in one of the digital streams. For example, a user may select a link on a web page (PID 01) that requests page 4 (PID 04). The set-top box can then switch to the requested digital stream and provide the requested web page to the user. If the link is not part of the digital transport streams, and if the cable system is so equipped, a request will be sent upstream to the head end. The head end will then retrieve the page and format the page as a digital transport stream. The webpage associated with the selected channel link will be transmitted to the set-top box on an analog channel. In order to maximize bandwidth, links that are located on the requested webpage may be accessed and requested by the web content server. Each of these links and links to links may also be encoded as digital transport streams and transmitted on the analog carrier as a separate digital transport stream. Thus, in such an embodiment, there may be interactivity between a user and the information content. The ability to provide two-way interactive content is only limited by the number of digital transport streams that are associated with each analog channel and the number of available analog channels. By decreasing the time between the encoding of and the transmission of, a separate webpage, the cable system can include more web pages on a single analog channel.

In certain embodiments, web content or other information content may be presented in a predefined format rather than as an instance of the web page in a web browser. For example, information from a web page may be acquired by the headend facility and formatted for display. This may be useful for providing access to news, sports, weather and other general information. Different content may be sent as different digital transport streams. In such an embodiment, a user would be limited to switching between the pages that are within the digital transport streams. As shown in FIG. 1A, the user would only be able to traverse the five pages (PID 01-PID 05). It should be understood that each category may also be provided on a separate analog channel or all of the content could be provided on a single analog channel.

In other embodiments, the digital transport streams are associated with one of the analog channels that are broadcasting TV content. For example, while watching a football game, a trigger may be sent from the head end indicating that there is additional information content. When the set-top box receives this command, the set-top box overlays an indicator on the broadcast TV content indicating that there is additional information content, such as, team statistics. If the user sends a signal from the user input device indicating that the user would like to view the content, the set-top box will switch to the appropriate analog channel and decode the digital transport stream associated with the team statistics. In certain embodiments, the set-top box may not need to switch analog channels as the digital transport streams may be transmitted on the analog channel carrying the broadcast information. Thus, information content may be associated with television content. The set-top box determines which digital stream to switch to by mapping data that is provided to the set-top box by the headend. This mapping data is a look-up table that maps broadcast channels to digital transport streams.

In certain analog cable systems, the headend only transmits information content and does not receive upstream data from the set-top box of a user. In these analog cable systems, interactivity can still be achieved such that a user may make a selection based upon information displayed on the user's television and as a result of that selection, a new display screen with information content is presented on the television. As already suggested, the information content that is provided as digital transport streams to the set-top box may be web pages from the Internet or other pre-formatted information content. In the following discussion, the information content will be assumed to be web page, however it should be understood that this is done for convenience to the reader and other information content may also be used with this system for interactivity in a one-way cable system without deviating from the scope of the invention.

In order to provide interactivity in these analog cable systems, the interactive content is limited to the information content in the multiple digital transport streams broadcast on one or more analog channels. A user selects one of the 6 Mhz analog channels that have been assigned by the cable provider as an interactive channel. The user is then provided with a selection screen that allows the user to select information content. For example, the user may be capable of selecting between information content, such as news, sports, weather and traffic. This selection screen is included as one of the digital streams in the digital transport streams.

The set-top box is equipped with a processor that is capable of receiving commands from a user input device and for selecting one of the digital transport streams for decoding based on the selected command. Additionally, the processor includes code that allows for superimposing an indicator on the television 132B as shown in FIG. 1B wherein the indicator 130B is a rectangular box that outlines a selection 133B. Using the received directional command, the processor moves the indicator from one location on the television screen to another location and allows the user to select new information content by using a 'selection' key 138B on the remote control 137B. As such, the processor has an instruction set for deciding on the appropriate digital transport stream to decode. In certain embodiments, the head end sends mapping data (including PMT, PAT) to the set-top box 134B allowing the set-top box to determine which link (133B, 135B, 136B, 139B, 140B) has been selected by as the result of a received selection signal from a user input device 137B. This is especially useful if actual web pages are displayed that do not have links arranged in a grid like pattern. The set-top box access the mapping data which is a look-up table and determines based upon directional commands received where the indicator should be drawn on the screen as well as which digital transport stream to switch to if a 'select' signal is subsequently received. In other embodiments, in which the content is preformatted, the set-top box has a mapping program already preconfigured, such that when a directional command is received from a user device the set-top box can access the mapping program and will know where to place a selection indicator or which new page of information content should be displayed from the digital transport streams if a 'select' signal is received.

Figure 1C:
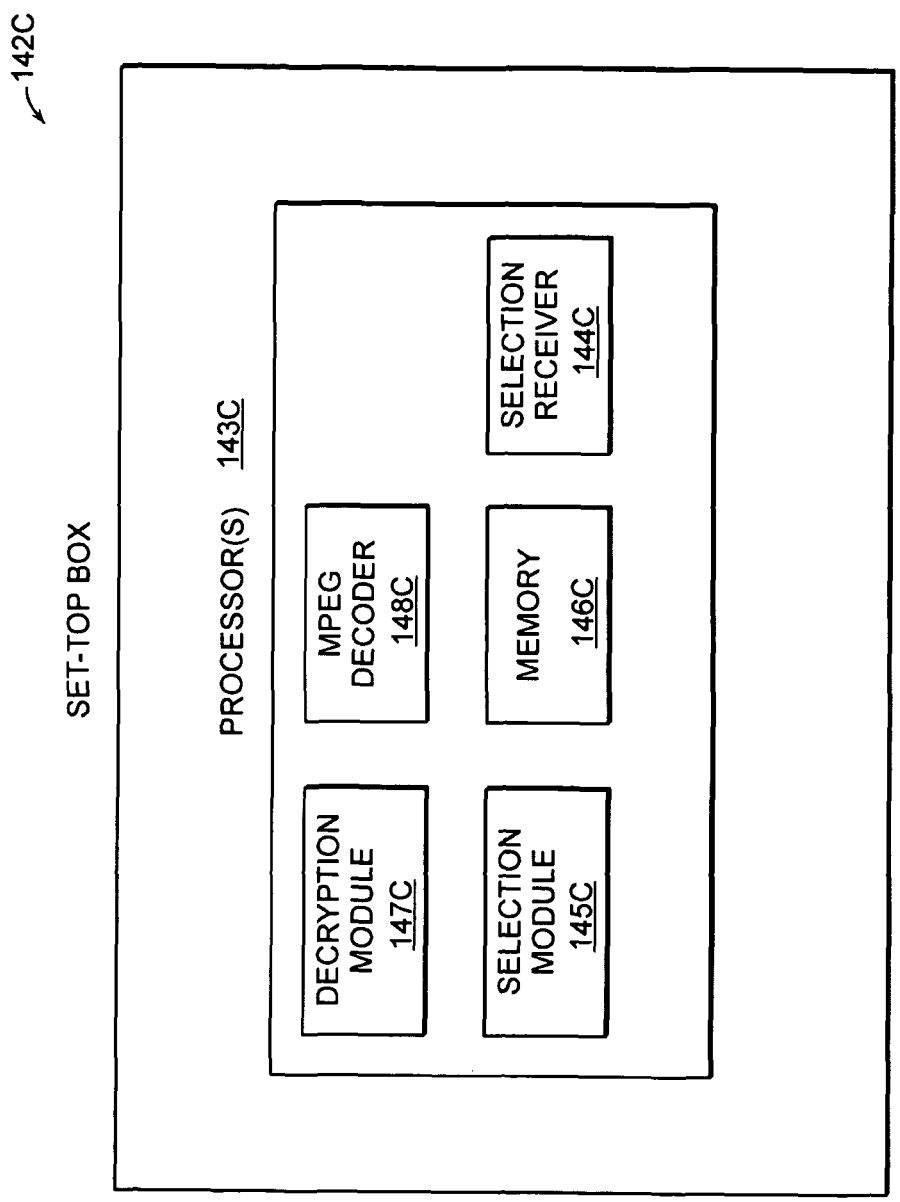
FIG. 1C shows the various modules that are included inside of the set-top box.

FIG. 1C shows the various modules that are included inside of the set-top box 142C for allowing interactive content to be selected without an upstream channel. The set-top box 142C contains one or more processors 143C. Each module that is shown in FIG. 1C may be computer code that is executable on a processor or each module may be a separate processor. Additionally, it should be understood that the functionality of multiple modules may be combined together.

The set-top box 142C receives a command from a user input device. For example, a remote control may transmit an IR (infra-red) signal to a sensor on the set-top box. A selection receiver module 144C, receives this signal and passes the signal on to a selection module 145C. The selection module 145C executes code that determines the digital transport stream to decode and forward to the user's television. After the digital transport stream is selected, the digital data from the stream is sent to memory 146C prior to providing the data to the decryption module (if applicable) 147C and the MPEG decoder 148C. The memory provides a buffer for the streaming data. The encryption module 147C and the MPEG decoder module 148C can use the memory 146C to store data through the decryption and decoding processes.

Figure 1D:
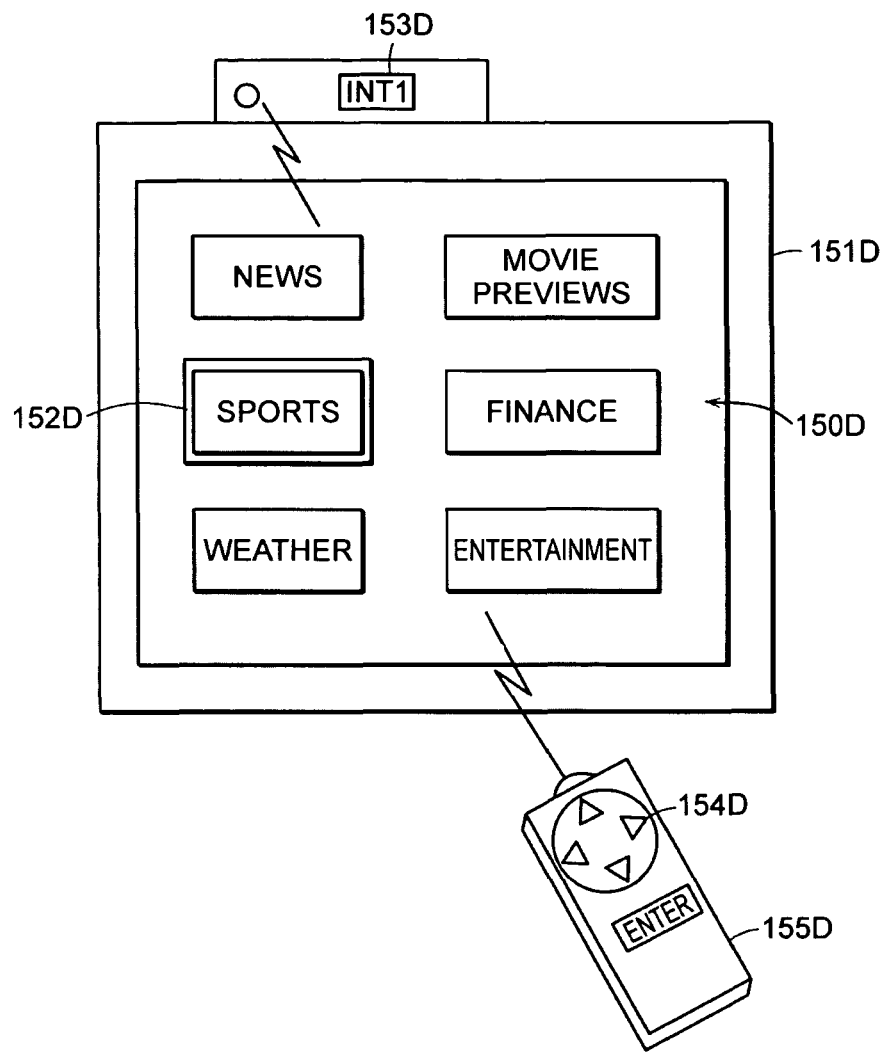
FIG. 1D shows an example of a selection screen provided on a television of a user.

The selection module 145C also determines if a selection indicator needs to be superimposed on the image to be displayed of the digital transport stream. For example, as shown in FIG. 1D a selection screen 150D is provided on the television 151D of a user. A rectangular indicator 152D is provided around the selectable content for 'sports.'

When the user changes the television to the interactive channel 153D, the selection module selects the digital transport stream containing the selection screen 150D and then the selection module either superimposes the rectangular indicator 152D or replaces code in the MPEG stream so that the indicator will appear on the television at a known location around a possible selection. The user can then move between the various selections by using the directional keys 154D on the input device 155D. The selection module receives these commands and causes the indicator to be redrawn on the television screen so that it appears to the user as if the user has moved the indicator from one possible selection to the next.

In one embodiment, information about the initial position of the selection indicator and the possible locations for the selection indicator are provided by the headend in one of the digital transport streams. Thus, the selection module receives data that provides mapping information and allows the selection module to determine where to place the rectangular indicator based on the commands forwarded from the selection receiver. In other embodiments, the position of possible selections on all of the screens is predetermined by the cable company, and therefore, the mapping information is stored in the set-top box and is accessed by the selection module. Mapping information may include coordinates on a television screen indicative of possible selections. For example, the mapping information may indicate that a rectangle should be initially drawn at position 100, 0 where the rectangle has a length of 40 and a width of 20 pixels with a line width of 2. The mapping information would also indicate that if a 'select' command is received, the set-top box should select digital transport stream 1. There would be similar information (location and associated digital transport stream) for each of the possible selections presented on the television. As shown in FIG. 1D, there are six possible selections (News, Sports, Weather, Movie Previews, Finance, and Entertainment). Each selection is associated with a first digital transport stream (News 1, Sports 11, Weather 17 etc.). Each of the selections may also be associated with additional digital transport streams (News 1-10, Sports 11-16, Weather 17-18 etc.). As a result, News would have a tree of possible screens of information that is 10 screens deep.

Figure 1E:
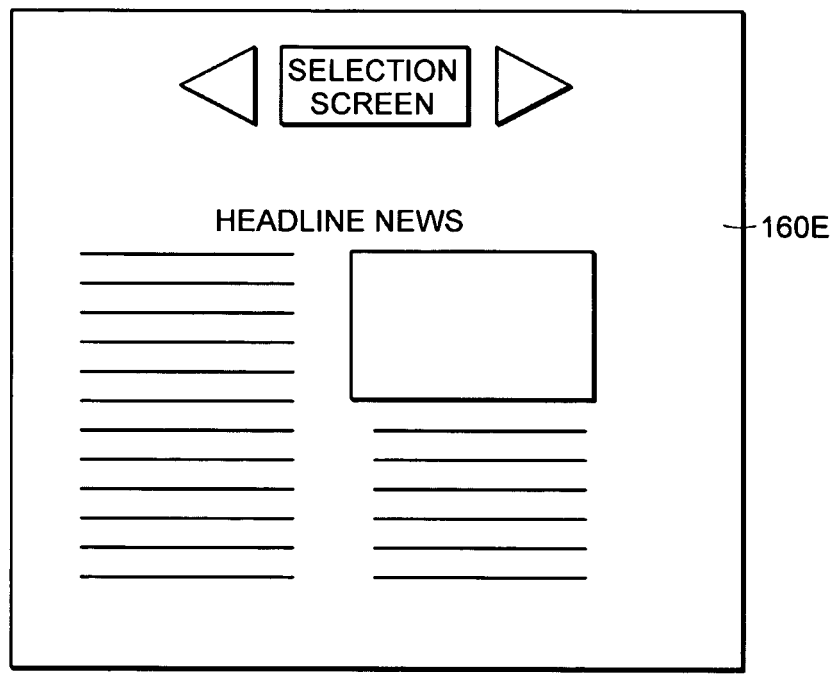
FIG. 1E shows an example of a screen that is presented on a user's television if the user selects News.

FIG. 1E shows a possible screen 160E that may be presented if a user selects News. The user would then be able to move forwards and backwards between news pages/digital transport streams 1-10. A directional key on a remote, could be used such that if a right key were selected, the next sequential digital transport stream would be decoded. Similarly, if a left key was selected the previous digital transport stream would be selected. Additionally, the user would be able to return to the initial selection screen by selecting the selection screen button.

When a user causes a 'selection' to be made by pressing a button (e.g. "enter") on a remote control and the selection module determines which digital stream to decode, the selection module then accesses the decryption module. As the data from the selected digital transport stream is streamed into the memory, the decryption module will begin the decryption process. The decryption module performs the decryption algorithm on the data. Each set-top box may be provided with its own private key which is stored in non-volatile memory. Any known type of encryption and decryption scheme that is compatible with packetized data, such as an MPEG stream can be used (for example, asymmetrical key encryption). Once the data is decrypted the data is passed to the MPEG decoder. The MPEG decoder looks for a marker that indicates the beginning of a video frame, such as an I-frame. When the marker is found in a header, the decoder can begin decoding the video frames using standard MPEG decoding. The decoded video is then output to the television. The video may undergo a digital to analog conversion in a digital to analog converter prior to its transfer to the television. It should be understood that the digital data streams may not be encrypted and therefore the decryption module may not be necessary.

As previously stated, the digital video streams may be associated with a regular broadcast analog channel. When information content is associated with a broadcast, a trigger must be sent from the head end to the set-top box announcing that there is enhanced content. The set-top box is equipped to monitor a digital image stream associated with the analog channel of the broadcast for a trigger signal. When the trigger signal is identified by the set-top box, the set-top box makes an announcement to the television viewer indicating that there is enhanced information content. The announcement may come in the form of an overlay if the broadcast television signal is analog or replacement of a portion of data in a decoded MPEG I-frame if the broadcast television signal is composed of digital data broadcast on the analog channel frequency. For example, once the data of the MPEG I-frame is decoded, the upper right hand pixel data may be replaced by an indicator that there is enhanced data. The indicator may simply be a box that states "enhanced content available." The enhanced content may include notification of upcoming events or programs, interactive advertising, news associated with the program, or even additional video content. The user may then select the enhanced content by pressing a request key and the set-top box will switch to the appropriate analog channel and decode the appropriate digital transport stream associated with the enhanced content associated with the broadcast channel.

In a different embodiment, a multi-angle video service may be provided. In this embodiment, only one-way communication is necessary. The multi-angle service is based on a one quarter of a screen resolution at a low frame rate, such as, 8 frames per second. The multi-angle views are provided as enhanced content, where each view is provided on a different digital transport stream. A user of such a system is notified by the set-top box that multi-angle viewing is available for a program. If the user selects multi-angle viewing by pressing a 'select' key on the user input device, the set-top box switches to a selection screen that allows the user to select between one of the four available views. Based upon the selected view, the set-top box switches to the appropriate digital transport stream and decodes and presents the digital transport stream on the user's television.

FIG. 1F is a flow chart of the steps that are performed by the set-top box when a request is made for interactive content in a cable system that provides only one-way transmission of information content. A signal generated by a user input device is received by the set-top box. The set-top box responds by changing the tuner from the presently received channel to an interactive channel that has been assigned by the cable system. The set-top box then receives the corresponding analog signal for the interactive channel including the channel's associated digital transport streams (190F). The set-top box decodes a first digital transport stream including mapping data and a selection screen. The mapping data associates an identifier for a digital transport stream with a screen location or directional command for the selection screen. The mapping data may be in a look-up table. For example, mapping data may indicate that the first digital transport stream has an identifier of PID01 and is selected if a 'selection signal' is received from the user input device. The second digital transport stream may have an identifier of PID02 and is selected if a right directional signal is followed by a selection signal from the user input device, and so on for each digital transport stream. The set-top box decodes and possibly decrypts the selection screen and outputs the selection screen in either digital or analog format to the television set of the user (191F). Additionally, the set-top box will superimpose a selection indicator on one of the possible selections. In the mapping data provided from the headend is coordinate locations for drawing a rectangular box around a selection. In certain embodiments, after the selection screen has been decoded, the set-top box substitutes pixel data into the selection screen data and the proper positions for creating an indicator around a first selection. The set-top box will then receive one or more command signals from the user input. Referring to FIG. 1D, the set-top box receives a down directional command signal followed by a selection signal. As shown in FIG. 1D, the set-top box first moves the selection indicator around the selection "sports" after receiving the down directional command. When the set-top box receives the selection command, the set-top box consults the look-up table and determines that the digital data stream for 'sports' should be displayed. The set-top box then decodes and outputs, the digital transport stream containing the interactive information content to the user's television for display (192F).

Figure 2:
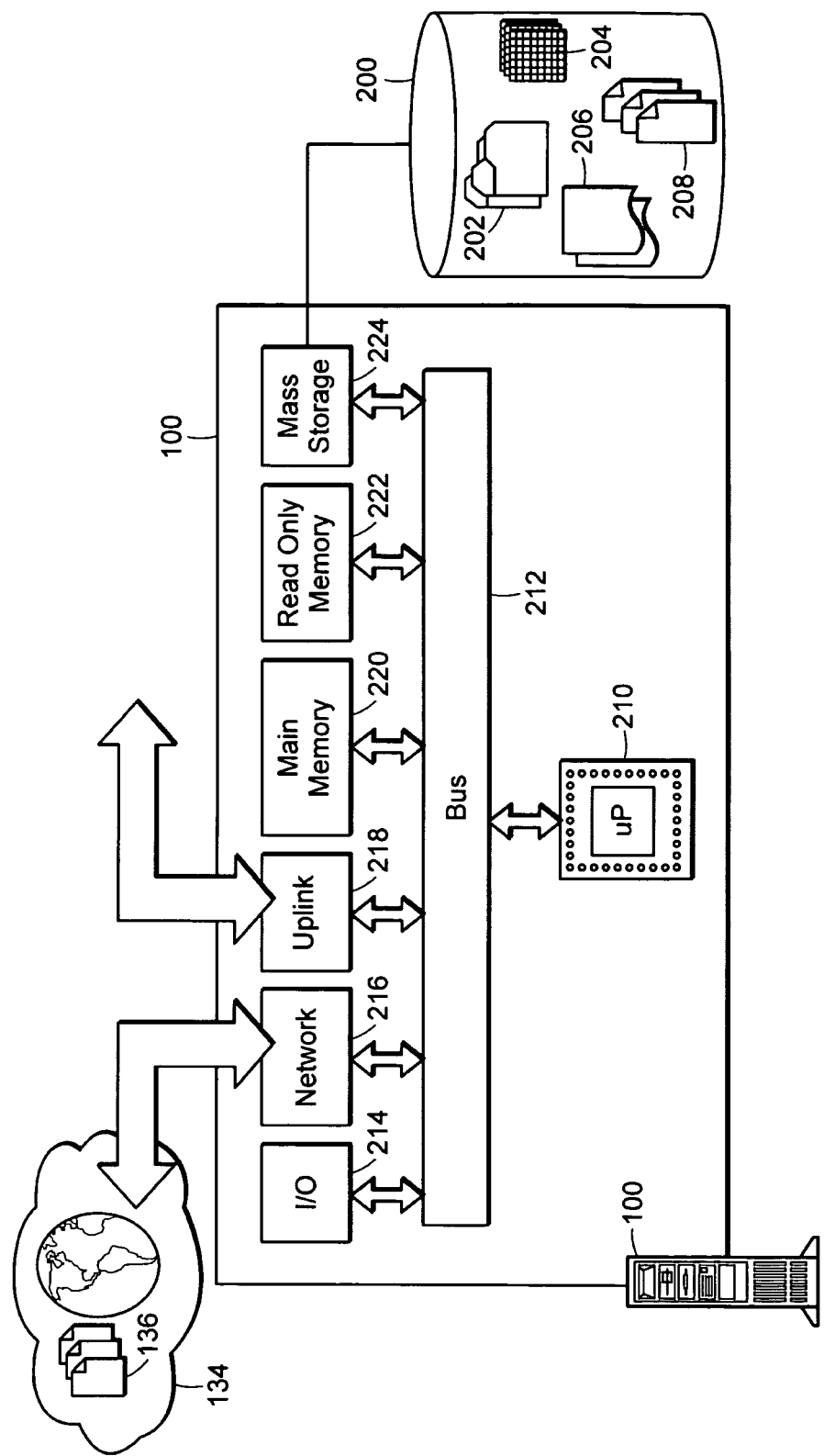
FIG. 2 is a hardware block diagram of a computer suitable for implementing the web content server shown in FIG. 1.

FIG. 2 is a hardware block diagram of a server suitable for implementing the web content server shown in FIG. 1. The server 100 includes at least one processor 210 for processing information. The processor couples via a bus 212 with Input/Output (I/O) devices 214, network device 216, uplink device 218, main and read only memories 220-222 and mass storage device 224. The I/O device 214 may include keyboard and display. The network device 216, wired or wireless, couples the server with the Internet 134, or other wide area network (WAN) or local area network (LAN). The uplink device couples to the uplink module 138 for modulating the transport streams onto the analog TV channel. The main memory 220 stores information and instructions for the processor. The read only memory 222 stores static information and boot instructions for the server. The mass storage device 224, such as magnetic disk and associated disk drive, couples with the bus 200 for storing information and instructions on the storage medium 200. The storage medium contains: program code 202, setup tables 204, administrative web pages 206 and may also include content pages 208. Content pages 136 may alternately be found on the Internet 134.

Figure 3:
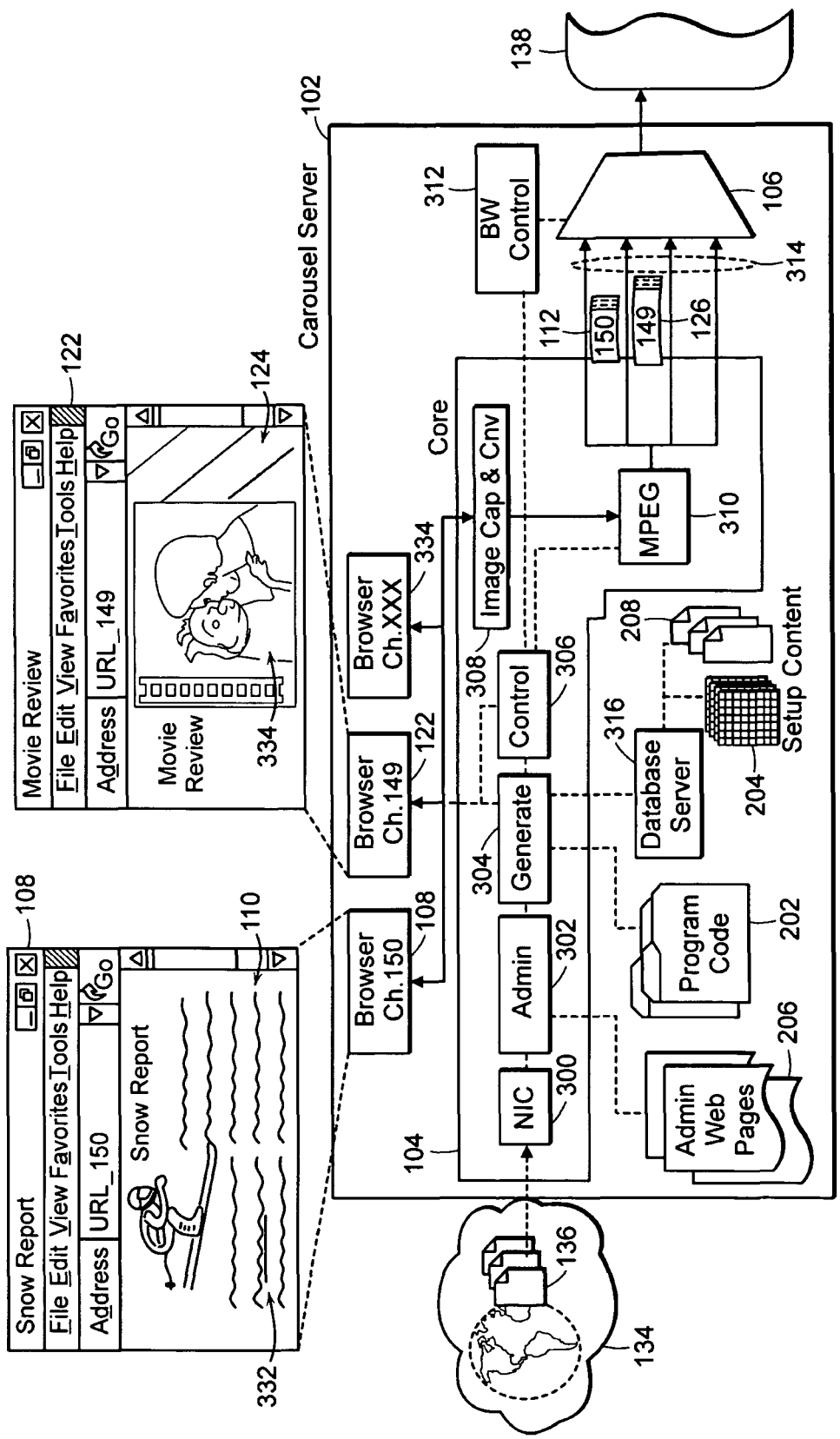
FIG. 3 is a software block diagram of the web content server shown in FIG. 2.

FIG. 3 is a software block diagram of the web content server shown in FIG. 2. The carousel server 102 includes: core module 104, multiplexer 106, a database server 316 and the various data structures. The data structures include administrative web pages 206, program code 202, setup table 204 and content web pages 208. The core includes a network interface 300, an administrative module 302, a carousel generator 304, a carousel controller 306, and a digital image processing portion comprising the image capture and conversion module 308 and MPEG compressor 310.

The NIC 300 couples to the Internet 134, to provide an alternate source for channel content. The multiplexer 106 couples with the uplink module 138 shown in FIG. 1. During an administrative phase of operation the administrative module 302 controls user login and access to one or more of the administrative web pages 206. These pages (See FIGS. 4A-E) include forms for the input and update of the setup and channel parameters for the carousel server. As the user enters the data the administrative server writes the data to the appropriate table and record within the setup tables, e.g. the channel table 600 and the setup table 602 shown in FIGS. 6A-B. For each new channel a corresponding master HTML page is defined. That page may be stored locally as one of the content pages 208 or may be located on the web as indicated by web pages 136 shown on the Internet.

At the completion of the administrative phase the generation module 304 generates a number of browser instances 108, 122 and 334, corresponding to the number of channel records in the channel control table 600. Each browser is initialized at its own corresponding master HTML page (See FIG. 5 for example) indicated in the starting URL field 470 of the associated record in the channel table 600 (See FIG. 6A).

In the example shown browser instance 108 is initialized at HTML master page 208 shown in FIG. 5. This page has its own URL. Pages which are subsequently displayed in the I-frame structure within the corresponding HTML master page 208 may themselves be stored on the server of may be found on the Internet. A browser instance 108 is shown displaying web page 110 within the I-frame element. The page displayed includes URL 332. That URL will not provide an active link when it is displayed on the users screen A browser instance 122 is shown generated by the generation and control module 304. That browser instance displays page 124 within the browsers view window. Within the I-frame element of that page a streaming video 344 is shown displaying film clips. The generation module has also spawned a third browser instance 334 the content of which is controlled by the associated one of the HTML master pages 208. The controller 306 maintains active API links with each browser instance. Through these links the controller is able to determine when a particular browser instance has finished loading a new web page. The timing of these page loads may be determined by a program written in a script language and made part of the master page (See FIG. 5) which the corresponding browser instance then executes to cyclically display pages in the I-frame. Alternately, for other browser instances such as browser instance 122 the controller determines the appropriate reload or capture intervals for the channel from the corresponding record in the channel table 600 (See FIG. 6A). The controller causes the digital processing stage to periodically capture each browser instance's associated carousel images at time intervals determined either by the script in the master page or by the reload or capture parameters for the associated channel.

The digital processing stage includes the image capture and conversion module 308 and MPEG compressor 310. The image capture and conversion module is directed by the controller to periodically capture each browser instance's associated carousel images and to convert these from RGB format to a YUV image which is the preferred image format for MPEG2 compression. The MPEG2 compression is the next phase of operation and is performed successively for each browser instance by the MPEG compressor 310. The bandwidth accorded to each browser instance is governed under the direction of the controller by the encode bitrate parameters 480 and channel bitrate parameters 478 for the corresponding channel which are stored in the channel table 600 (See FIG. 6). The MPEG compressor outputs elementary streams for each browser instance. These elementary streams consist largely of "I" frames since the image update frequency for any channel is so slow in comparison to a normal video stream with 30 frames per second per channel being the norm. Here seconds may elapse before a subsequent image is processed for any channel. Each compressed image out of the MPEG compressor forms part of an elementary stream for the corresponding channel. The elementary streams 112 and 126 for channels 150 and 149 respectively are shown. These elementary streams are assigned a corresponding transport control protocol internet protocol (TCP/IP) port number which is the manner in which they are presented to the input of the multiplexer, i.e. as a inputs on a plurality of ports 314. Each port is associated with a corresponding channel, a corresponding browser instance. The output of the multiplexer is a transport stream with includes TS packets for each of the active channels. These are passed to the uplink module 138.

In an alternate embodiment of the invention the carousel server may be coupled with alternate communication mediums wired and wireless to deliver TV channels to subscribers. Alternate communication mediums include: subscriber line direct to the home or satellite direct to the home for example. In these embodiments the multiplexer output would be passed to the appropriate modulator for transport on the wired or wireless communication medium.

FIGS. 4A-E show several of the web pages presented by the administrative module 302. The administrative module 302 provides administrative web pages 206 to configure the system and information channels a.k.a. "carousels". In an embodiment of the invention the module may additionally provide for: machine view; status; modification and addition of users and content providers and help.

Figure 4A:
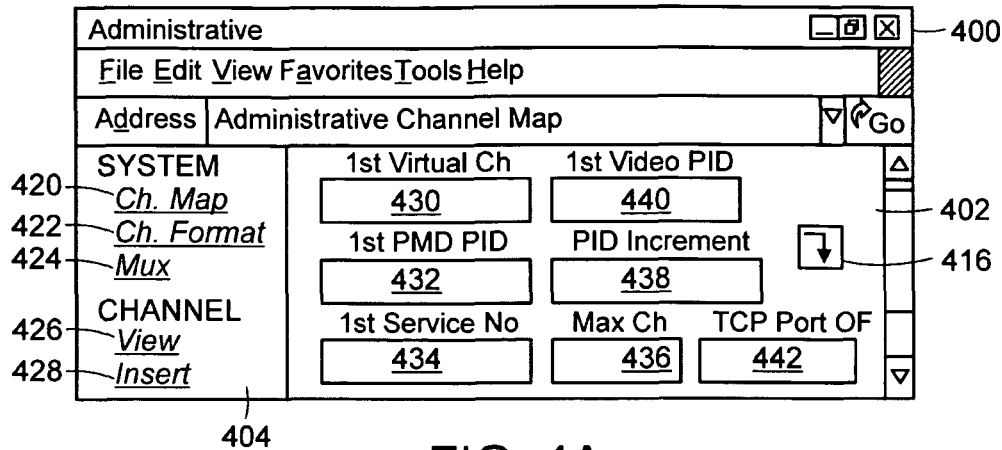
FIGS. 4A-C show the graphical user interfaces associated with administrative 30 setup of the web content server shown in FIGS. 1-3.
Figure 4B:
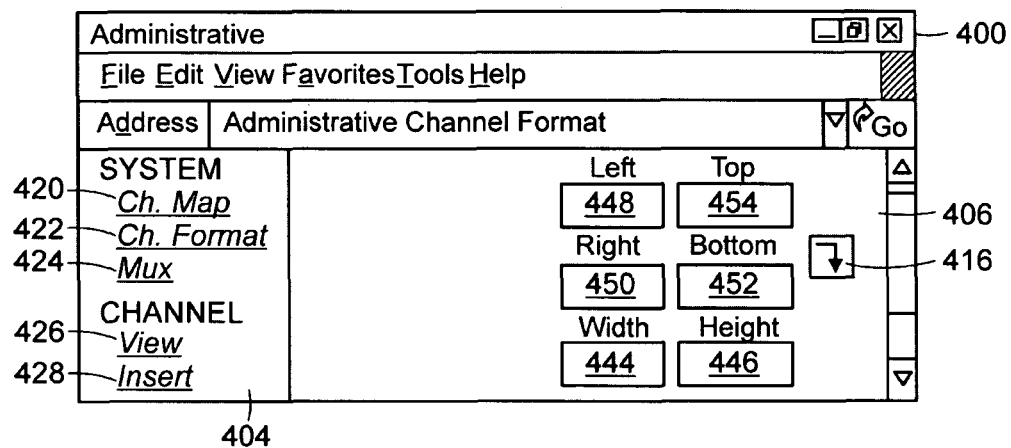
Figure 4C:
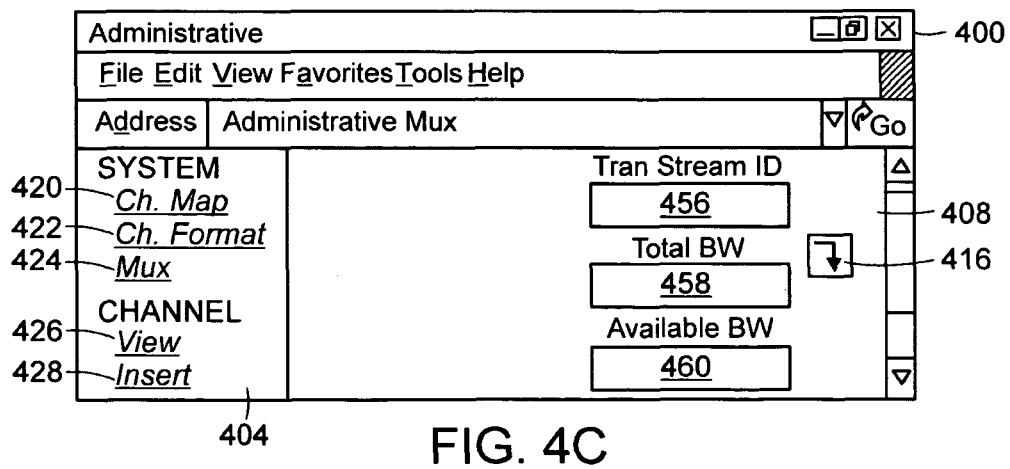
Figure 4D:
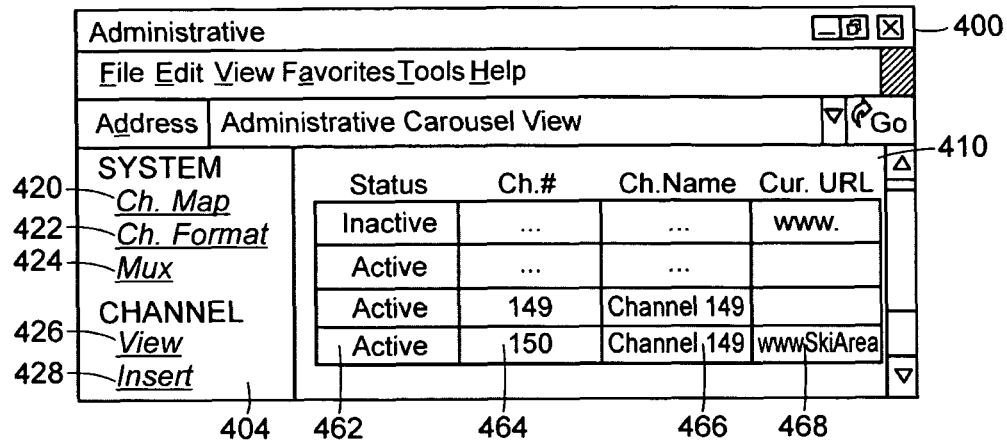
FIGS. 4D-E show the graphical user interfaces associated with viewing, inserting, and modifying selected ones of the content carousels associated with each low bandwidth digital channel provided by the web content server shown in FIGS. 1-3.
Figure 4E:
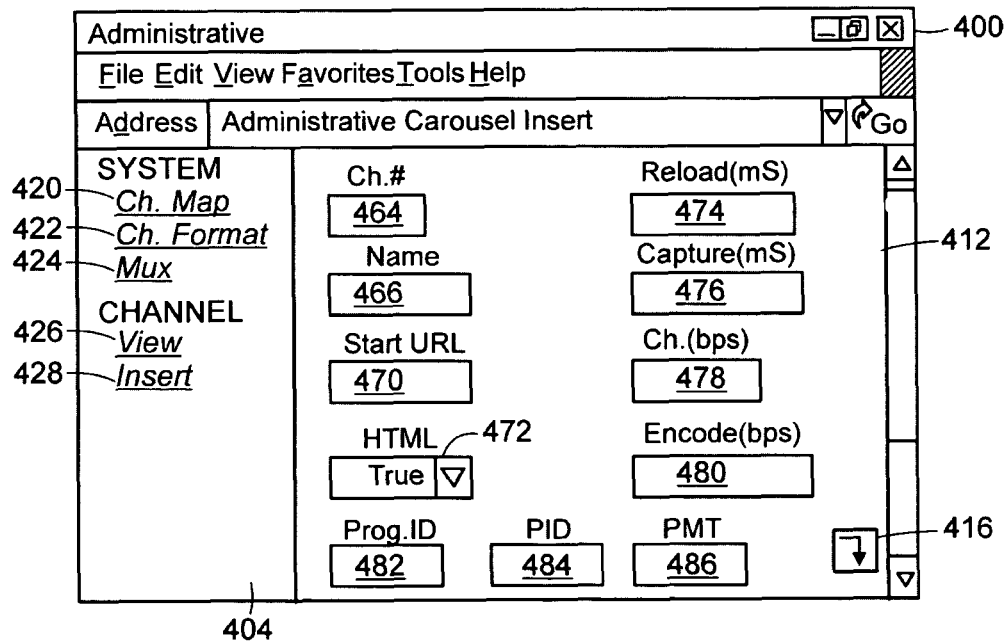

FIGS. 4A-C show the graphical user interfaces associated with administrative setup of the web content server shown in FIGS. 1-3. FIGS. 4D-E show the graphical user interfaces associated with viewing, inserting, and modifying selected ones of the content carousels associated with each low bandwidth digital channel provided by the web content server shown in FIGS. 1-3. Each screen is shown as a browser based graphical user interface with a menu frame 404 on the left and a main frame on the right. The page displayed in the main frame depends on the user menu selection. In an alternate embodiment of the invention user interfaces would be windows based rather than browser based. The pages shown in the following FIGS. 4A-E are presented to an administrator after a successful user login from a login screen (Not shown).

In FIG. 4A the administrator has selected menu choice 420 which is the channel map. This selection results in the display of page 402 in the right hand frame of the browser 400 view area. The channel map handles input and update of channel map parameters in a form with input fields for the: virtual channel 430, the program mapping table packet identification code (PMT PID) 432, the service number 434, the maximum number of channels 436, the PID increment 438, the video PID 440 and the transport control protocol (TCP) port offset 442. A submit element 416 on the page 402 allows for input or update of the values of these fields and entry of the associated field of information into the system setup table 602 (See FIG. 6B). This table is part of the setup tables 204 which are accessible by the carousel module 104 via the database server 316 shown in FIG. 3. The virtual channel field 430 identifies the first virtual channel number for the range used by the carousel server. The virtual channels will be numbered from the first virtual channel to the first virtual channel plus the maximum number of channels minus one. The virtual channel numbers are assigned by local or national cable plant personnel. The virtual channel number is part of the channel map which is downloaded to every one of the set top boxes 174, 180 and 186 shown in FIG. 1. The virtual channel number is the number displayed to the user by the set-top box or channel guide. The program mapping table packet identification code (PMT PID) 432 is the MPEG stream number for the PMT for the first virtual channel. The PMT PID for the remaining virtual channels are incremented by the PID increment 438. All PMT PIDs must be in the range 17-8190. Each PMT PID must be different for each of the video PIDs. The value is usually 17. The service number 434 gives the service number or MPEG program number for the first virtual channel. This number is local to the MPEG transport stream for a given analog carrier frequency. The remaining virtual channels use the next higher service numbers. All service numbers must be in the range 1-65535. The value is usually set to 1. The maximum number of channels field 436 indicates the maximum number of channels which will be supported in the MPEG transport stream. Each of these possible channels will be given an equal share of the available bandwidth This value is typically 30. The PID increment 438 indicates the change in PMT PID values for increasing virtual channels and also the change in video PIDs. The value is typically 4. The video PID 440 is the MPEG stream number for the video data for the first video channel. The video PIDs for the remaining virtual channels are incremented by PID increment. All video PIDs must be in the range 17-8190. This value is typically 18. The transport control protocol (TCP) port offset 442 is the number added to the virtual channel number to determine the TCP socket used by the MPEG digital multiplexer 106 to receive MPEG data from the MPEG compressor 310 in the carousel.

In FIG. 4B the administrator has selected menu choice 422 which is the channel format. This selection results in the display of page 406 in the right hand frame of the browser 400 view area. The channel format page handles input and update of channel format parameters in a form with input fields for the aspect ratio and margins of the screen image. Fields 448-454 accept the user inputs for the left, right, top and bottom screen margins respectively. Fields 444-446 accept user inputs for the width and height respectively of the actual image displayed on the TV. The values are in multiples of 16 with a recommended value of 640 for the width and 480 for height. The submit element 416 on the page 406 allows for input or update of the values of these fields and entry of the associated field of information into the system setup table 602 (See FIG. 6B).

In FIG. 4C the administrator has selected menu choice 424 which is the setup parameters for the multiplexer 106 (See FIG. 3). This selection results in the display of page 408 in the right hand frame of the browser 400 view area. The multiplexer setup page handles input and update of multiplexer parameters in a form with input fields for the: transport stream ID 456, total bandwidth 458 and available bandwidth 460. The transport stream ID provides the MPEG stream ID number. The value is typically in the range of 1 to 65535. The total bandwidth is the analog carrier bandwidth in MHz. For the United States this value should be 6. The available bandwidth is the amount of analog carrier bandwidth that may be used for the various carousels controlled by the carousel core 104 (See FIG. 1). The submit element 416 on the page 408 allows for input or update of the values of these fields and entry of the associated field of information into the system setup table 602 (See FIG. 6B).

In FIG. 4D the administrator has selected menu choice 426 which is the carousel view. This selection results in the display of page 410 in the right hand frame of the browser 400 view area. This page provides information on each carousel/channel that the user is allowed to access. Each screen displays a predefined number of carousels. The information is dynamically updated. The defined carousel statuses are as follows: Inactive, Active, Crashed, Bad URL, Pending and Unknown. For each carousel, the status, channel number, channel name and URL currently displayed on the channel are displayed. The <backward> and <forward> buttons allow the user to page backward and forwards through the various channels.

If a particular Channel Number (a.k.a. Carousel) is selected while within the Carousel View page 410, the Modify/Input Carousel page 412 is displayed. This page is the substantially the same page displayed when a user selects insert channel menu item 428 from the menu page 404. The difference between the two access paths to this page is that in the modify case the page form input elements display the parameters currently in the associated record in the channel table 600 (See FIG. 6A) and may additionally include current status information for the carousel. In the insert carousel case the form input elements contain null entries initially and no status information since the channel is not yet established.

The Modify/Input Carousel page is shown in FIG. 4E. The channel number field 464 allows entry of the channel number assigned to the carousel. This value is typically from 1-4095. The channel name field 466 allows entry of the channel name assigned to the selected channel/carousel. The starting uniform resource locator (URL) field 470 allows entry of the start up path or web address for the master HTML, page 208 (See FIG. 5) of which there is one for each channel. The URL that is loaded when the carousel starts. The program ID field 482 allows user input of the program ID for the associated channel. The program ID has a typical value from 1-65535. The PID field 484 allows user entry of a value corresponding with the PMT rate in the transport stream output of the multiplexer 106 (See FIG. 3). The PMT field 486 allows user entry of the program mapping table ID. The channel bit rate field 478 allows user input of a value which controls the image quality and refresh frequency of the MPEG frames. Values typically range from 10,000-10,000,000 bps. The encoding bit rate field 480 allows user input of a value which controls the maximum amount of data, typically 1,000,000-10,000,000 bps that is sent out per second. The reload interval field 474 allows user input of a value corresponding with the time period, typically 2,000-3,600,000 mSec at which the URL is reloaded. This field is not used if the HTML field 472 is set to TRUE, because the HTML script will control the update parameters. The capture interval field 476 allows user input of a value corresponding with the time period, typically 2,000-3,600,000 mSec at which the URL is captured without having to reload the web page. This field is not used if the HTML field 472 is set to TRUE, because the HTML script will control the update parameters. The HTML field 472 allows user selection of Boolean "TRUE" or "FALSE" values.

These values define how the carousel core 104 will process the start URL field 470. If the HTML field 472 is TRUE, then the start URL field must contain a web page that defines which web pages are displayed and at what rate pages are updated and changed. If the field is FALSE, then the start URL field contains a web page that is updated or reloaded as defined by the reload and capture interval fields. Typically the reload, capture or refresh interval is one or two orders of magnitude less than the image capture rate for a normal video stream in which 30 frames are captured every second. This greatly reduces the bandwidth requirements and allows more channels to be carried on a 6 MHz analog channel. In MPEG terminology, the MPEG compressor will typically only output "I" frames for each channel and will avoid creation of "B" or "P" frames.

Where the page 412 is for an existing channel which is being modified the following information may additionally be provided: the current state of the carousel; the URL currently displayed, the # of unsuccessful loads of the URL, the time at which the carousel was started and the last refresh, capture and load times. Additionally, where more than one carousel is being operated in a clustered format the IP address of the master carousel may also be displayed. The Carousel status is updated at the bottom of screen for each command. The supported carousel States are as follows:

Inactive, Active, Crashed, Bad URL, Pending and Unknown. The submit icon 416 allows user entry of the parameters in the form 412 to the associated record in the channel table 600 shown in FIG. 6A. Additional interfaces may be added to reset, start, stop, remove or refresh the associated carousel/channel.

In alternate embodiments of the invention additional administrative screens may be added for setting up various accounts and privileges to each of the above mentioned screens for users including content providers. Screens may also be added to handle multiple servers working in a clustered arrangement.

FIG. 5 shows a master web page 208 for a channel (See FIG. 2). The master web page defines content associated with a single digital channel. There is one master web page for each channel. The master page may be formatted in several different ways depending on the channel to be displayed. In FIG. 5 the master page for the "Ski" channel associated with the browser instance 108 in FIG. 3 is shown. That page to include a persistent portion and a cyclic portion. The cyclic portion is defined by the embedded floating frame in which a slide carousel of additional web page(s) may be displayed. The persistent portion is the remainder of the page which remains in the browsers view window throughout the session. Within the cyclic portion the set of web pages defined in array 500 are cyclically displayed, for time intervals determined by the script embedded in the persistent portion of the page.

The embedded cyclic frame portion is formed from an HTML element identified as an "Iame" which is currently specifically supported by Internet Explorer® Microsoft Corporation Redmond, Wash. This element departs from the standard FRAME structure syntax. This in-line framing method (also called "floating frames") is basically a method to embed other HTML documents within the framework of a regular HTML document structure with the level of placement control allowed by the MG element. In implementation and display it is created and treated much like the OBJECT element. The hypertext markup language (HTML) floating frame element 508 is embedded in the master page. The contents of the floating frame are cycled at a predefined time interval in round robin fashion between the web sites of the various ski areas selected by the content provider. The pages displayed list among other information the snow levels and ski conditions at each ski resort. The URLs for the web pages to be displayed sequentially are contained in a carousel array 500 which may contain any number 1-N of URLs. The page also includes three functions 502, 504, 506 written in a script language for cycling the URLS in the array 500 within the frame element 508. The script language shown is JavaScript® Netscape N.Y., N.Y. Other script languages may be used. The browser instance for the corresponding channel executes the script in the master HTML page 208 when the page is loaded thus cycling the image displayed in the I-frame portion 508 of the page 208 in round robin fashion among the various web sites represented by the URLS in the carousel array 500. This type of master HTML page allows controls the timing of uploading and display of each URL. As the corresponding URL is uploaded the generator and control module 304 of the carousel core 104 (See FIG. 3) is notified via an associated API of the browser instance. When the channel record for which this page is the starting URL is established the value of to HTML field 472 would be set to Boolean "TRUE" indicating that the master page is to control the timing of page update and change. Other HTML master pages for other channels could follow the same or a different format. In an alternate embodiment of the invention a master page may in fact include both a persistent parent frame set, and associated persistent and cyclic child frame pages. In this embodiment of the invention the persistent one of the child frame pages contains the script referred to above the effect of which is to change the page displayed in the therefore cyclic child frame.

The master page for the "Movie Review" channel shown in the browser instance 342 in FIG. 3 might show a single page in which the page or a frame element thereof would display an active graphical element, e.g. a streaming video of various movie previews. The sequencing from one preview clip to another would be provided by the content provider as part of the streaming video. For this type of master page there would be no page cycling. Thus in the associated channel record the value of the HTML field 472 would be set to Boolean "FALSE" indicating that the master page does not control the timing of page update and change. Instead the user would setup the channel record with the appropriate value for the capture interval in field 476. At the end of each capture interval the generator and control module 304 would cause the image grabber 306 to capture the page.

In other embodiments of the invention the HTML master page might be a persistent page with no cyclic page. Such a page might for example contain stock market data updated from time to time by the content provider. For the channel corresponding with this type of master HTML page the channel record value of HTML field 472 would also be set to Boolean "FALSE" indicating that the master page does not control the timing of page update and change. Instead the user would setup the channel record with the appropriate value for the reload interval in field 474. At the end of each reload interval the generator and control module 304 would cause the browser instance to reload the page and the image capture and converter 308 to capture the page after reloading.

FIGS. 6A-B show the channel and system setup tables respectively. These individual tables are part of the set of setup tables 204 shown in FIGS. 2-3. The channel table 600 shown in FIG. 6A contains individual setup records for each of the channels. Each record contains a plurality of setup parameter fields, e.g. fields 462-486 for identifying the channel name, starting URL, refresh/reload/capture interval, bandwidth requirements and various elementary stream and transport stream identifiers. These records were input by the administrator/user via input pages shown in FIGS. 4D-E. The system setup table 602 shown in FIG. 6B contains the system parameters for each analog channel including: channel mapping, channel format, and bandwidth allocation for the combined channels as input by the user via input pages shown in FIGS. 4A-C.

Figure 7:
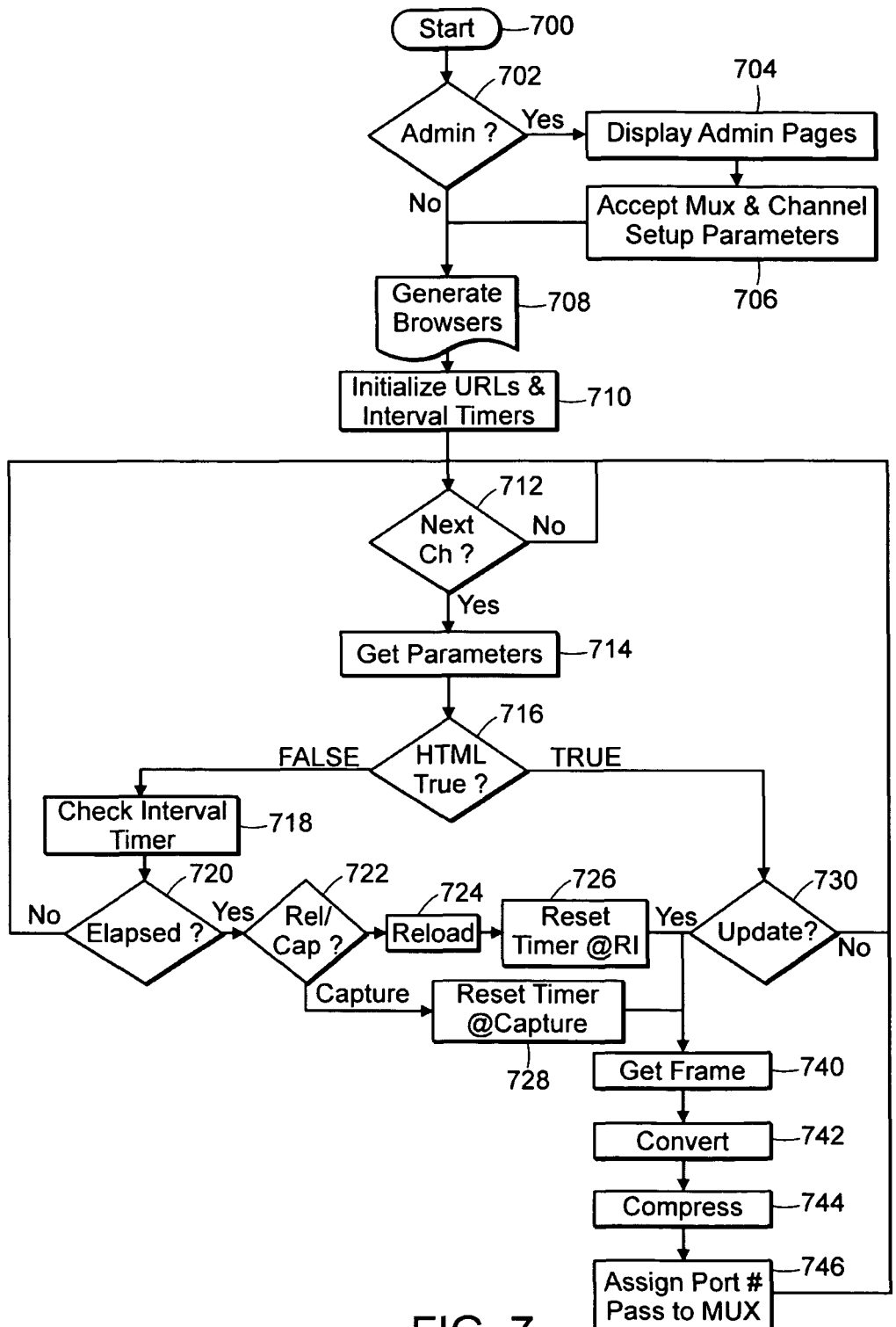
FIG. 7 is a process flow diagram for the web content server shown in FIGS. 1-3.

FIG. 7 is a process flow diagram for the web carousel server shown in FIGS. 1-3. Processing begins at start block 700 in which system initialization is performed.

Next in decision process 702 a determination is made as to whether a successful administrative login has taken place. This determination is made by the administrative module 302 (See FIG. 3) using user name and password information. If an administrative login has taken place then control passes to process 704 in which the administrator may select among the administrative Web pages 402,406-412 shown in FIGS. 4A-E to set system parameters or to add or update parameters for existing channels. In process 706 the parameters updated or entered by the user via the forms on any of the administrative web pages are written to either the channel or system set up tables 600-602 respectively shown in FIGS. 6A-B. Control is then passed to process 708. Process 708 is the same process reached directly from decision process 702 when there is no administrative login.

In process the 708 the generator 304 of the carousel server 102 determines which channels are to be activated from the parameters stored in the channel set up table 600 shown in FIG. 6A. These parameters were loaded into the channel set up table during the administrative access in processes 704-706. The generator then initializes a browser instance for each channel in the channel setup table. An associated interval timer or similar software construct is initialized in main memory 220 (See FIG. 5 2) for each channel for which the "HTML" field parameter is FALSE. These timers allow the reload or capture interval to be determined for the associated channel In process 710 each browser is initialized with a respective starting URL 470 for that channel as indicated in each channels record in channel table 600. The starting URL points to the master HTML page 208 for each corresponding channel. The master page for each channel may be stored on the carousel server or may be available over the Internet 134. Each channel will independently begin cycling through the one or more HTML pages indicated in the Carousel list in the master HTML page 208 for each channel (See FIG. 5). These pages will be cyclically displayed in the cyclic portion of the master page, e.g. the I-frame structure.

Next in decision process 712 the processes associated with image capture and compression are commenced. In decision process 712 a determination is made by the controller as to whether the next channel, i.e. the next active browser, is to be serviced. This decision can be made on the basis of interrupts generated by the browser instances running as independent "threads" or processes, when a new or refreshed HTML page is present in the corresponding browser or the decision can be made on the basis of a fixed round-robin sequence in which the controller services each of the browser instances. Next in process 714 the parameters for the channel to be serviced are obtained from the associated record in the channel setup table 600 shown in FIG. 6A.

Then in decision process 716 a determination is made as to whether the parameter in HTML field 472 of the associated channel record in table 600 is Boolean "TRUE" or "FALSE". If the Boolean value is TRUE control is passed to decision process 730. In decision process 730 a determination is made by the controller 304 as to whether the browser instance which is being serviced has generated an interrupt or other indication that a new page has been loaded. If not, control passes to decision process 712 for the servicing of the next channel If however the channel being serviced has indicated via interrupt, or other application interface that a new page has been loaded then the control is passed to process 740 for capture of the image displayed in the inline frame element 508 of the corresponding master HTML page 208 (See FIG. 5).

If alternately in decision process 716 a determination is made that parameter in the HTML field 472 of the corresponding channel record is Boolean "FALSE" then control is passed to process 718. In process 718 the value of the interval timer for the associated channel is determined. The timer allows the reload or capture interval for the associated channel to be continuously tracked. The simplest form of timer is a count down timer with the count down value re-initialized with each frame grab at the value for whichever of a reload or capture parameter for the associated channel is to indicated in fields 474-476 of the associated channel record (See FIG. 6A). Next in decision process 720 a determination is made as to whether the reload or capture interval for the associated timer has elapsed. If not control returns to decision process 712 for the servicing of the next channel. If the associated countdown timer has elapsed than control passes to decision process 722.

In decision process 722 a determination is made as to whether the record for the associated channel is one which calls for a reload interval in field 474 or a capture interval in field 476. If the channel is one which calls for a capture control is passed to process 728. A channel that requires a capture at a given interval is a channel which does not require reloading of the web page. This type of channel is appropriate where the corresponding web page(s) embed streaming video, Active X® or Power Point Microsoft Corporation, Redmond Wash., presentations. In process 728 the interval timer for the corresponding channel is reset with the capture interval value stored in capture field 474 of the channel record. Control is then passed to process 740 in which the image capture, i.e. frame grab for the associated channel is effected by the frame grabber 306 under the direction of the controller 304 (See FIG. 3).

Alternately, if it is determined in decision process 722 that the associated channel is set up for reloading at a reload interval then control is passed to process 724. In process 724 the browser that is being serviced is directed by an API initiated by the controller 304 to reload the current page. Control is then passed to process 726 in which the interval timer for the corresponding channel is reset with the capture interval value stored in the capture field 476 of the channel's associated record in channel table 600 (See FIG. 6A). Control is then also passed to process 740.

In process 740 the image capture for the associated channel is affected by the image capture and conversion module 308 under the direction of the controller 306 (See FIG. 3). Control is then passed to, process 742 in which the RGB digital image captured by the image capture and conversion module is converted to YUV format which is the input format used by MPEG2 compression systems. Control next passes to process 744 in which the converted image is subject to MPEG compression in the MPEG compressor 310 shown in FIG. 3. Next in process 746 the images for each channel are assigned a corresponding elementary stream and port number. Then they are passed to the bandwidth control 312 and the multiplexer 106 (See FIGS. 1, 3). The processes including bandwidth control in the multiplexer are set forth in greater detail in the following FIG. 8. Control then returns to decision process 712 for the servicing of the next browser instance, i.e. the next channel.

Figure 8:
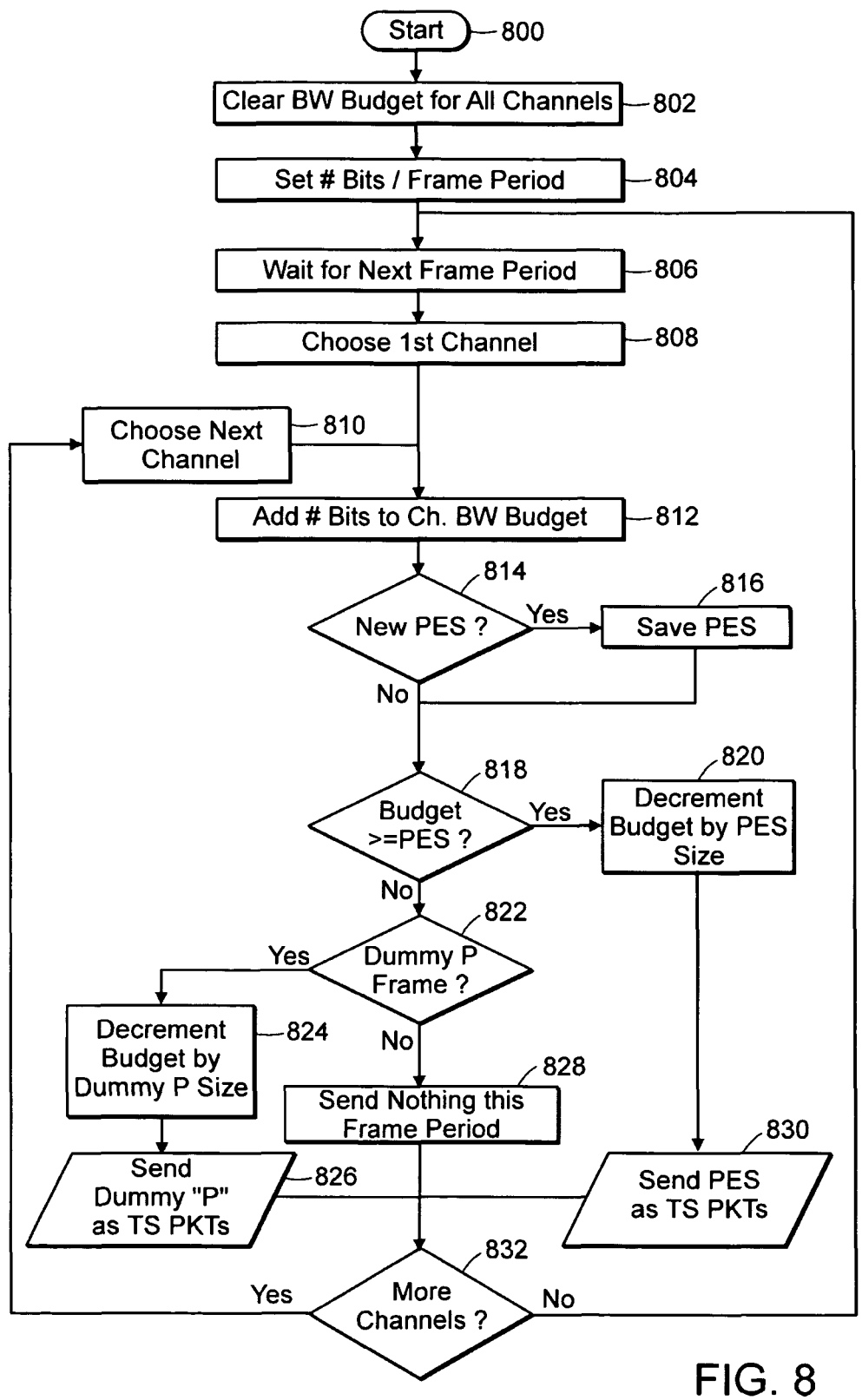
FIG. 8 is a detailed process flow diagram of the bandwidth regulating and multiplexer processes performed in the bandwidth controller and the multiplexer shown in FIG. 3.

FIG. 8 is a detailed process flow diagram of the bandwidth regulating and multiplexer processes performed in the bandwidth controller 312 and the multiplexer 106 shown in FIG. 3. Processing begins in start block 800 in which the system is initialized. Control then passes to process 802 which clears the bandwidth budget for all channels. Control then passes to process 804 in which the number of bits for each channel in a relevant measuring period is calculated. The National Television Standards Committee (NTSC) proscribes a frame rate of 29.97 frames per second for a broadcast television channel. This is the interval chosen to regulate bandwidth for each channel on the transport stream. The total usable bitrate is derived from field 460 of system table 602 (See FIGS. 4C-6B) by subtracting the bitrate required for PMT, PAT, PCR packets and a small reserve. The bitrate for one channel is determined by dividing the total usable bitrate by the product of the number of channels times the frame rate. Control is then passed to process 806 in which the next frame period is awaited. At the start of the next frame period control is passed to process 808 in which the channel is chosen. Control is then passed to process 812 in which the bit budget increment per frame period calculated in process 804 is added to the bandwidth budget for this channel. Control is then passed to decision process 814. In decision process 814 a determination is made for this channel as to whether there is a new PES packet. If there is not, control passes to decision process 818. If there is a new PES packet control passes to process 816 in which the new PES packet is saved in a channel buffer which is kept for this and every other channel by the multiplexer, after which buffering control is also passed to decision process 818. In decision process 818 a determination is made as to whether there is a saved PES packet stored in the corresponding buffer and whether the current bandwidth budget for the channel being processed is greater than or equal to the size of the PES packet. If it is, then in process 820 the bandwidth budget for this channel is decremented by the size of the packet, and then in process 830 the corresponding PES packet is sent and control is passed to decision process 832.

Alternately, if in decision process 818 the current bandwidth budget for the channel does not exceed the size of the PES packet in the corresponding buffer then control is passed to decision process 822, in which a determination is made as to whether a dummy "P" frame needs to be sent. That determination itself rests on one of two conditions: a) if a PES packet was sent in the previous frame interval a dummy "P" frame is sent or b) if the time elapsed since the last packet was sent for this channel exceeds that required for proper performance of the set top box then a dummy "P" frame is sent to keep the communication stream to the set top box or TV active for this channel. If a determination is made that no dummy "P" frame needs to be sent then in process 828 nothing is sent and control passes directly to decision process 832. Alternately, if a "P" frame is to be sent then in process 824 the bit budget for the channel is decremented by the size of the dummy "P" frame and control is passed to process 826 in which the corresponding dummy "P" frame is sent. Subsequently control is passed to decision process 832. In decision process 832 a determination is made as to whether more channels remain to be processed in this frame period. If so control passes to process 810 for selection of the next channel and subsequent processing in process 812. If no more channels remain to be processed in this interval then control returns to process 806 to await the start of the next frame period.

In multiplexor 106 (See FIG. 3), the PES packets sent in process 830 and the dummy P-frames sent in process 826 are combined with PAT, PMT and PCR streams to create an MPEG2 transport stream. The data from each stream is broken up and stored in the payload of 188-byte TS packets. All the TS packets are queued and the transport stream is constructed by taking TS packets out of the queues. The queuing provides a buffering function to handle short bursts where TS packets arrive faster than they can be output to the transport stream. The bandwidth regulation ensures that the average data rate is less than the output rate.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A method for transmitting a plurality of input information content signals as an output data stream on an analog channel from a cable head end including:

a. for a given input information content signal in the plurality of input information content signals, capturing a series of images from the given input information content signal, compressing the series of images, forming a given input digital data stream from the compressed series of images, the given input digital data stream broken into packets, and outputting the given input digital data stream to a multiplexer;

b. regulating the bandwidth of the given input digital data stream at the multiplexer, the given input digital data stream associated with a current bit allocation total, including, during each frame time:

adding a bit allocation increment to the current bit allocation total for the given input digital data stream;

when a data packet to be transmitted for the given input digital data stream is received by the multiplexer, storing the data packet; and when the number of bits in the stored data packet is not more than the current bit allocation total for the given input digital data stream, forwarding the stored data packet for transmission in the output data stream on the analog channel and decrementing the current bit allocation total for the given input digital data stream by the number of bits in the stored data packet.

2. A method according to claim 1 wherein the output data stream is encoded as an MPEG stream.

3. A method according to claim 1 wherein the given input digital data stream is representative of a web page.

4. A method according to claim 1 wherein regulating the bandwidth of the given input digital data stream at the multiplexer further includes during each frame time:

when the number of bits in the stored data packet is more than the current bit allocation total for the given input digital data stream, forwarding a dummy frame packet for transmission in the output data stream and decrementing the current bit allocation total for the given input digital data stream by the number of bits in the dummy frame packet.

5. A method according to claim 4, wherein the dummy frame packet contains a P frame.

6. A method according to claim 1 wherein capturing a series of images from the given input information content signal and regulating the bandwidth of the given input digital data stream at the multiplexer are repeated for each input information content signal in the plurality of input information content signals.

7. A computer program product for use on a computer system for transmitting a plurality of input information content signals as an output data stream on an analog channel from a cable head end, the computer program product comprising a non-transitory computer readable medium having computer readable program code stored thereon, the computer readable program code including:

a. for a given input information content signal in the plurality of input information content signals, program code for capturing a series of images from the given input information content signal, compressing the series of images, forming a given input digital data stream from the compressed series of images, the given input digital data stream broken into packets, and outputting the given input digital data stream to a multiplexer;

b. program code for regulating the bandwidth of the given input digital data stream at the multiplexer, the given input digital data stream associated with a current bit allocation total, including, during each frame time:

adding a bit allocation increment to the current bit allocation total for the given input digital data stream;

when a data packet to be transmitted for the given input digital data stream is received by the multiplexer, storing the data packet; and when the number of bits in the stored data packet is not more than the current bit allocation total for the given input digital data stream, forwarding the stored data packet for transmission in the output data stream on the analog channel and decrementing the current bit allocation total for the given input digital data stream by the number of bits in the stored data packet.

8. A computer program product according to claim 7 wherein the output data stream is encoded as an MPEG stream.

9. A computer program product according to claim 7 wherein the given input digital data stream is representative of a web page.

10. A computer program product according to claim 7 wherein regulating the bandwidth of the given input digital data stream at the multiplexer further includes during each frame time:

when the number of bits in the stored data packet is more than the current bit allocation total for the given input digital data stream, forwarding a dummy frame packet for transmission in the output data stream and decrementing the current bit allocation total for the given input digital data stream by the number of bits in the dummy frame packet.

11. A computer program product according to claim 10, wherein the dummy frame packet contains a P frame.

12. A computer program product according to claim 7 wherein capturing a series of images from the given input information content signal and regulating the bandwidth of the given input digital data stream at the multiplexer are repeated for each input information content signal in the plurality of input information content signals.

* * * * *